(12) United States Patent
Brooks

(10) Patent No.: US 11,374,961 B2
(45) Date of Patent: Jun. 28, 2022

(54) METHODS FOR VERIFICATION OF SOFTWARE OBJECT AUTHENTICITY AND INTEGRITY

(71) Applicant: Reliable Energy Analytics LLC, Westfield, MA (US)

(72) Inventor: Richard Brooks, Westfield, MA (US)

(73) Assignee: Reliable Energy Analytics, LLC, Westfield, MA (US)

( * ) Notice: Subject to any disclaimer, the term of this patent is extended or adjusted under 35 U.S.C. 154(b) by 224 days.

(21) Appl. No.: 16/933,161

(22) Filed: Jul. 20, 2020

(65) Prior Publication Data

US 2021/0029151 A1 Jan. 28, 2021

Related U.S. Application Data

(60) Provisional application No. 62/878,073, filed on Jul. 24, 2019.

(51) Int. Cl.
*H04L 9/40* (2022.01)
*G06Q 50/06* (2012.01)
*H04L 9/32* (2006.01)

(52) U.S. Cl.
CPC ......... *H04L 63/1433* (2013.01); *G06Q 50/06* (2013.01); *H04L 9/3218* (2013.01); *H04L 9/3247* (2013.01); *H04L 63/123* (2013.01)

(58) Field of Classification Search
CPC . H04L 63/1433; H04L 9/3218; H04L 9/3247; H04L 63/123; G06Q 50/06
See application file for complete search history.

(56) References Cited

U.S. PATENT DOCUMENTS

| | | | | |
|---|---|---|---|---|
| 9,183,533 B2* | 11/2015 | Serra | ...................... | G06Q 10/10 |
| 10,193,695 B1* | 1/2019 | Endress | ................. | G06V 20/80 |
| 2007/0143629 A1* | 6/2007 | Hardjono | ............ | H04L 63/0823 |
| | | | | 713/181 |
| 2013/0277425 A1* | 10/2013 | Sharma | .................. | B65D 90/00 |
| | | | | 235/376 |
| 2015/0100793 A1* | 4/2015 | Newell | ................. | H04L 9/3263 |
| | | | | 713/189 |
| 2016/0342917 A1* | 11/2016 | Surapaneni | .......... | G06Q 10/087 |
| 2018/0018627 A1* | 1/2018 | Ross | ....................... | G06Q 50/28 |
| 2018/0189784 A1* | 7/2018 | Grabowski | ........ | G06Q 20/4014 |
| 2020/0099513 A1* | 3/2020 | Angelo | ................... | G06F 21/64 |

(Continued)

OTHER PUBLICATIONS

"In-toto Specification", Lukpueh (Lukas Puhringer) GitHub, https://github.com/lukpueh, Published Apr. 11, 2017.

(Continued)

*Primary Examiner* — Ghodrat Jamshidi
(74) *Attorney, Agent, or Firm* — Richard Kosakowski

(57) ABSTRACT

A computer-implemented method includes determining, by a processor, an authenticity of a software object and its supply chain and providing an authenticity result indicative thereof; determining, by the processor, an integrity of the software object and its supply chain and providing an integrity result indicative thereof; and determining, by the processor, from the authenticity result and the integrity result, a score indicative of an amount of trust in the supply chain of the software object and in the software object, wherein the score is indicative of an amount of trust that the software object will work correctly if installed in a system that utilizes the software object.

19 Claims, 12 Drawing Sheets

(56) References Cited

U.S. PATENT DOCUMENTS

2021/0039851 A1* 2/2021 Narayanan .............. A61J 1/035
2021/0067536 A1* 3/2021 Mylrea .................... G06F 8/65

OTHER PUBLICATIONS

"How it Works—aDolus," Retrieved from the Internet at https:www.adolus.com/how-it-works, Retrieved on Aug. 24, 2020. 5 pages.
"Bitsight," Retrieved from the Internet at https:www.bitsight.com/, Retrieved on Aug. 24, 2020. 1 page.
"FICO," Retrieved from the Internet at https:www.fico.com/en/solutions/fico-cyber-risk-score, Retrieved on Aug. 24, 2020. 6 pages.
"Fortress Information Security," Retrieved from the Internet at https:fortressinfosec.com/, Retrieved on Aug. 24, 2020. 9 pages.
"ImmuniWeb AI for Application Security," Retrieved from the Internet at https:www.immuniweb.com/, Retrieved on Aug. 24, 2020. 6 pages.
"Security Ratings | SecurityScorecard," Retrieved from the Internet at https:securityscorecard.com/product/security-ratings, Retrieved on Aug. 24, 2020. 7 pages.
"Upguard, Reduce cyber risk, prevent breaches and protect consumer data," Retrieved from the Internet at https:www.upguard.com/, Retrieved on Aug. 24, 2020. 6 pages.
"QED Secure Solutions," Retrieved from the Internet at https:www.qedsecure.com/, Retrieved on Aug. 24, 2020. 1 page.
"Team8, Moody's Developing New Framework to Measure Cyber Risk," Retrieved from the Internet at https:www.msspalert.com/cybersecurity-news/team8-moodys-partner/, Retrieved on Aug. 24, 2020. 4 pages.
"Cyber Supply Chain Risk Management," Retrieved from the Internet at https:csrc.nist.gov/Projects/cyber-supply-chain-risk-management/key-practices, Retrieved on Aug. 24, 2020. 6 pages.
"Cybersecurity Risk Score Options Available," Retrieved from the Internet at https:reliableenergyanalytics.com/cyber-risk-score, Retrieved on Aug. 24, 2020. 5 pages.
Byres, Eric et al., "Session 1: Threats and Risks," IEEE Smart Grid Cybersecurity Workshop 2019, Atlanta, GA Dec. 12-13, 2019, 40 pages.
Brooks, Richard et al., "Session 3: Supply Chain," IEEE Smart Grid Cybersecurity Workshop 2019, Atlanta, GA Dec. 12-13, 2019, 35 pages.
National Institute of Standards and Technology ("NIST") Special Publication 800-30 Revision 1, "Guide for Conducting Risk Assessments," Sep. 2012, Retrieved from the Internet at https://csrc.nist.gov/publications/detail/sp/800-30/rev-1/final, Retrieved on Aug. 24, 2020. 95 pages.
NASA "Software Assurance Standard," NASA-STD-8739.8 w/Change 1, Jul. 28, 2004. 67 pages.
Boyens, Jon et al., National Institute of Standards and Technology ("NIST") Special Publication 800-161, "Supply Chain Risk Management Practices for Federal Information Systems and Organizations," Apr. 2015, Retrieved from the Internet at https://nvlpubs.nist.gov/nistpubs/SpecialPublications/NIST.SP.800-161.pdf, Retrieved on Aug. 24, 2020. 282 pages.
National Institute of Standards and Technology ("NIST") Special Publication 800-37 Revision 2, "Risk Management Framework for Information Systems and Organizations—A System Life Cycle Approach for Security and Privacy," Dec. 2018, Retrieved from the Internet at https://nvlpubs.nist.gov/nistpubs/SpecialPublications/NIST.SP.800-37r2.pdf, Retrieved on Aug. 24, 2020. 183 pages.

* cited by examiner

METHODS FOR VERIFICATION OF SOFTWARE OBJECT AUTHENTICITY AND INTEGRITY

CROSS-REFERENCE TO RELATED APPLICATIONS

The present application claims the benefit of U.S. Provisional Patent Application No. 62/878,073, filed Jul. 24, 2019, the contents of which are incorporated by reference herein.

FIELD OF THE INVENTION

The subject matter disclosed herein relates in general to risk assessment methods that verify the integrity of the supply chain with regards to software products, and in particular to such methods which verify the identity or authenticity of a Software Object (as defined hereinafter) and its Supply Chain (as defined hereinafter), and which also verify the integrity of a Software Object and its Supply Chain, after obtaining the Software Object from the Software Source (as defined hereinafter) within the Supply Chain and prior to installing the Software Object in the cyber systems associated with a bulk electric system ("BES") or other cyber assets used within critical infrastructure.

BACKGROUND

Electric utility companies have responsibilities to insure the proper operation of a BES. Besides the physical hardware associated with electrical generation and transmission, a BES is generally taken to include the industrial control system hardware and software, and the computing and networking services (i.e., the cyber assets or cyber systems) associated with operation of the BES. Cybersecurity risks in the "Smart Grid" are increasing, largely due to the increasing decentralization of the makeup of an electric supply system. As such, security controls are put in place by energy industry regulatory agencies and mandated for use by electric utility companies. These security controls are intended to protect the operation of critical cyber system assets of the BES from harm caused by malicious attempts to exploit the BES cyber systems, for example, via the "software distribution" type of attack vendor. Many software development organizations use software distributors to distribute their software patches and updates to their customers, for example, energy utility companies for use within BES cyber systems. Thus, these security controls are in the nature of global supply chain risk management controls.

On Oct. 18, 2018, the Federal Energy Regulatory Commission ("FERC") issued Final Order No. 850 requiring all FERC Jurisdictional Entities (as defined hereinafter), which normally must comply with North American Electric Reliability Corporation ("NERC") Critical Infrastructure Protection ("CIP") Reliability Standards, to implement the security controls associated with FERC Order No. 850 by Jul. 1, 2020. This date has since been pushed back to Oct. 1, 2020. FERC Order No. 850 identifies several new requirements placed on electric utility companies, including the requirement to verify the integrity and authenticity of a Software Object prior to its installation in the baseline BES cyber system, which is addressed by embodiments of the present invention herein. To this end, NERC Reliability Standard CIP-010-3, Part 1.6, requires that a Responsible Entity (as defined hereinafter) verify the identity or authenticity of the Software Source, and verify the integrity of the Software Object obtained from the Software Source, prior to installing the software that changes established baseline configurations on a BES cyber system, when methods are available to the Responsible Entity to do so. Verifying the identity or authenticity of the Software Source ensures that the software being installed in the BES cyber system is from a legitimate source. Verifying the integrity of the Software Object ensures that the software being installed in the BES cyber system has not been modified from its original obtained source.

These two verification obligations thus comprise a comprehensive risk assessment process designed to detect and prevent harm to the BES and a utility company's generation and transmission systems by protecting the BES from harmful software (e.g., malware or counterfeit software) used in BES command and control. This results in an improvement to the electric industry's equipment and systems by requiring Responsible Entities to mitigate certain cybersecurity risks associated with the global Supply Chain for software for use on BES cyber systems.

As used herein, the phrase "the requirement to verify the integrity and authenticity of a Software Object" or similar language such as for example the term "Software Object Verification" should be understood to mean "the requirement to verify the identity or authenticity of a Software Supply Chain and to verify the integrity of the Software Object obtained from the Software Supply Chain."

According to the North American Transmission Forum ("NATF"), it is possible for a Responsible Entity to comply with both verification obligations of NERC Reliability Standard CIP-010-3, Part 1.6, by using a single method, for example, by validation of digitally signed software. However, while a digitally signed Software Object may indeed provide the identity of the signing party and may also verify that no changes to the Software Object have occurred, this method by itself has been proven to be unable to fully meet the requirements stated in the Purpose of CIP-010-3, that is, to perform "vulnerability assessment requirements in support of protecting BES Cyber Systems from compromise that could lead to misoperation or instability in the Bulk Electric System (BES)."

More specifically, it is known that digitally signed software alone will not fully prevent or detect software vulnerabilities. For example, known instances exist where malicious hackers successfully planted malware posing as official security updates onto servers and signed the software using legitimate digital certificates. In another example, attackers were able to minimize their detection by digitally code-signing their ransomware with an Authenticode certificate. A Software Object containing malware could have devastating impacts if it were to be installed in the command and control ecosystem of the BES, possibly resulting in harm or even death if electricity flow were to be impeded in critical cases, such as hospital use of ventilator machines in the fight against COVID-19.

In addition, on Mar. 7, 2019, NERC filed a petition with FERC requesting approval of proposed Reliability Standard CIP-008-6 titled "Cyber Security—Incident Reporting and Response Planning." NERC also requested approval of: (1) the associated implementation plan, violation risk factors and violation severity levels; (2) the inclusion of proposed revised definitions of "Cyber Security Incident" and "Reportable Cyber Security Incident" into the NERC Glossary; and (3) the retirement of currently-effective Reliability Standard CIP-008-5. FERC subsequently approved NERC's petition, and on Jun. 20, 2019, FERC issued a filing in response to NERC's petition, FERC Docket No. RD19-3-

000, requiring that Jurisdictional Entities subject to NERC CIP standards, be required to report certain cyber security incidents that are determined to be an "attempt to compromise" a BES cyber system, in conformance with CIP-008-6, which is now in effect. Thus, each Responsible Entity is required to notify the Electricity Information Sharing and Analysis Center ("E-ISAC") and, if subject to the jurisdiction of the United States, the United States National Cybersecurity and Communications Integration Center ("NCCIC"—formerly ICS-CERT), or their successors, of a "Reportable Cyber Security Incident" and a "Cyber Security Incident" that was deemed to be an "attempt to compromise," as determined by applying the relevant criteria in CIP-008-6.

Accordingly, what is needed are methods that verify the identity or authenticity of a Software Supply Chain and verify the integrity of a Software Object obtained from that Supply Chain prior to installation in the BES, methods that produce a score which is indicative of the confidence level of trustworthiness in the results of the executed verification methods to allow a user to readily determine whether or not to install the Software Object in the BES or other cyber assets used in critical infrastructure, methods that provide a tamperproof record of the results of the risk assessment verification methods, and methods that report attempts to compromise a BES cyber system which may be detected during execution of the verification methods.

SUMMARY

An object of exemplary embodiments of the present invention is to provide a method to verify the integrity of a Software Object and its Supply Chain using electronic and manual processes, applying both cryptographic and non-cryptographic techniques and implementing best known practices on an ongoing basis.

Another object of exemplary embodiments of the present invention is to provide a method to verify the identity or authenticity of a Software Object and its Supply Chain using electronic and manual processes, applying both cryptographic and non-cryptographic techniques and implementing best known practices on an ongoing basis.

Yet another object of exemplary embodiments of the present invention is to provide a method to produce a confidence level of trustworthiness in the results of the executed Software Object integrity and authenticity verification methods, referred to as a SAGScore (as defined hereinafter).

Still another object of exemplary embodiments of the present invention is to provide a method to produce a tamperproof record of the results of the executed Software Object integrity and authenticity verification methods, referred to as a tamperproof F850CR record (as defined hereinafter).

An additional object of exemplary embodiments of the present invention is to provide a method to verify a tamperproof F850CR record and produce human readable output of the contents of that record, referred to as a TF850CR report, along with a summarized view of the same information, referred to as a SAG Proof of Verification ("SAGPOV", as defined hereinafter).

Another object of exemplary embodiments of the present invention is to provide a method to track and report on trusted Software Objects which have been verified through the cumulative effect of SAG Software (as defined hereinafter) processing from all End User executions of the SAG Software worldwide and the recording of these results within the List of Trusted Software Objects (as defined hereinafter) in the SAG Server datastore.

Yet another object of exemplary embodiments of the present invention is to provide a method to facilitate the reporting to the E-ISAC and NCCIC monitoring and reporting entities of any suspected "attempt to compromise" Cyber Security Incident through use of a Software Object, based on the results of SAG Software Object Verification.

According to an embodiment of the present invention, a computer-implemented method includes determining, by a processor, an authenticity of a software object and its supply chain and providing an authenticity result indicative thereof; determining, by the processor, an integrity of the software object and its supply chain and providing an integrity result indicative thereof; and determining, by the processor, from the authenticity result and the integrity result, a score indicative of an amount of trust in the supply chain of the software object and in the software object, wherein the score is indicative of an amount of trust that the software object will work correctly if installed in a system that utilizes the software object.

These and other features and advantages of various embodiments of the present invention will become more apparent from the following description taken in conjunction with the drawings.

BRIEF DESCRIPTION OF THE DRAWINGS

The subject matter, which is regarded as the disclosure, is particularly pointed out and distinctly claimed in the claims at the conclusion of the specification. The forgoing and other features and advantages of the disclosure are apparent from the following detailed description taken in conjunction with the accompanying drawings in which:

FIG. 1, including

FIG. 2, including

FIG. 3, including

FIG. 4, including

FIG. 5, including

DETAILED DESCRIPTION

Figure 1A:
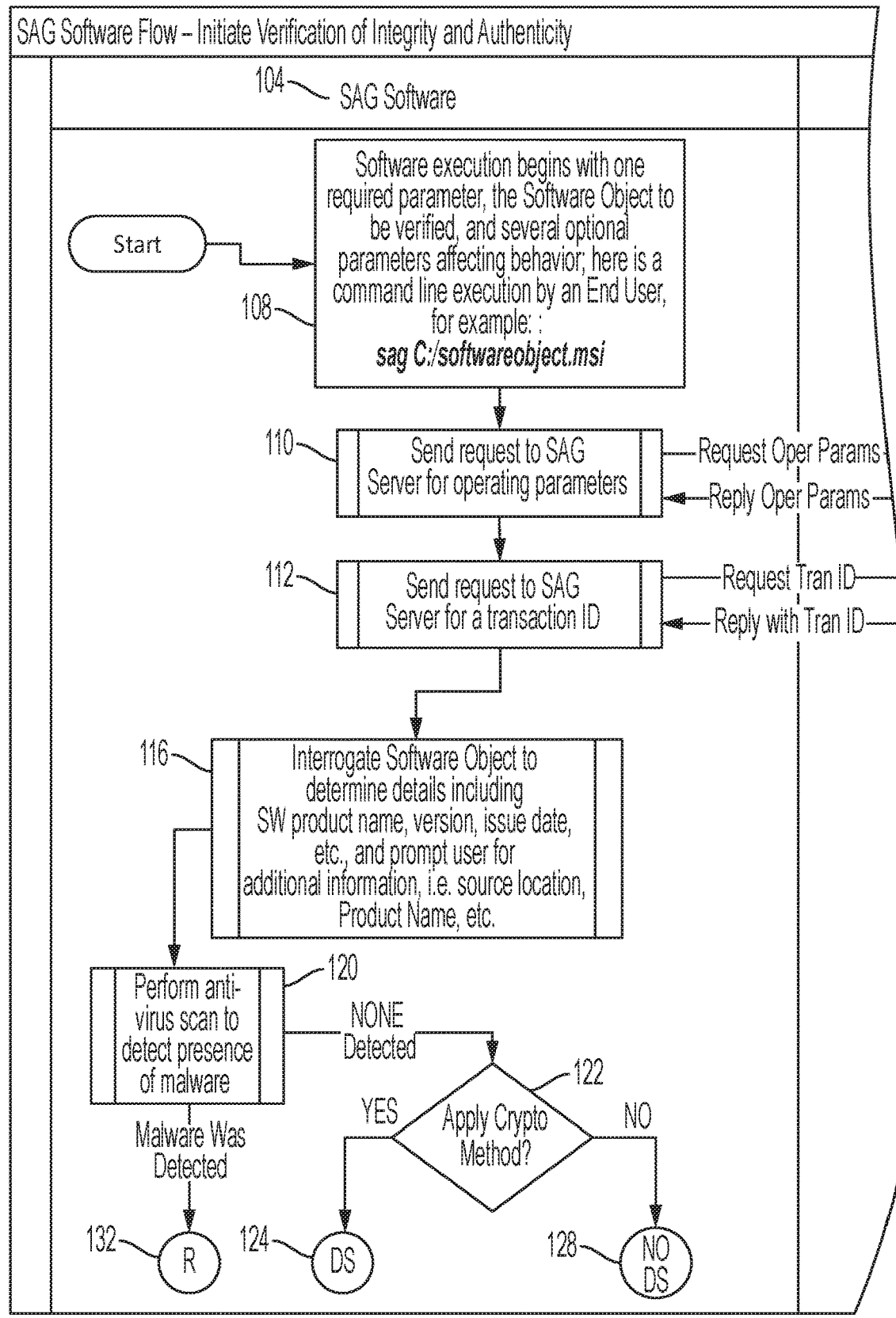
FIGS. 1A and 1B, is a flowchart diagram of a method used to initiate the integrity and authenticity verification of a Software Object and its Supply Chain, according to one or more embodiments of the present invention.

As used herein, the term "Software Object" means any binary or source code artifact that may be installed on, applied or added to a computer system and which is used to perform a functional operation while the system is powered on or off. The Software Object may be digitally signed but is not required to be.

As used herein, the term "SAG" is an acronym for the term "Software Assurance Guardian." Both "SAG" and "Software Assurance Guardian" are trademarks of the Applicant named herein, and for the software described and illustrated in detail herein.

As used herein, the term "SAG Software" means the software that embodies the methods for verifying the identity or authenticity of a Supply Chain, for verifying the integrity of the Software Object obtained from the Supply Chain, for determining a score which is indicative of the confidence level of trustworthiness in the results of the executed verification methods, for providing a tamperproof record of the results of the verification methods, for reporting any attempts to compromise a BES system, and for performing any other related functions described and illustrated herein and associated with these functions.

As stated hereinbefore, as used herein the phrase "the requirement to verify the integrity and authenticity of a Software Object" or similar language such as for example the term "Software Object Verification" should be understood to mean "the requirement to verify the identity or authenticity of a Software Supply Chain and to verify the integrity of the Software Object obtained from Software Supply Chain."

As used herein, the term "Supply Chain" refers to all entities, locations and paths taken to develop, store, retrieve and download a Software Object for use in a BES system or other critical infrastructure cyber asset.

As used herein, the term "FERC Jurisdictional Entity" means any entity that is subject to FERC regulations contained in the Code of Federal Regulations 18 CFR Part 40, and is subject to mandatory compliance with NERC Standards CIP-013-1 (Cyber Security—Supply Chain Risk Management), and CIP-010-3 (Cyber Security—Configuration Change Management and Vulnerability Assessments) Requirement 1, Part 6, as indicated in the Implementation Plan under the section titled Applicable Entities. These entities are listed in the NERC compliance registry and are subject to NERC/FERC compliance audits. "FERC Jurisdictional Entity" is the same party referred to in NERC CIP-013-1 and NERC CIP-010-3 as the "Responsible Entity."

As used herein, the term "Responsible Entity" means the party responsible for verifying Software Object integrity and authenticity, usually a FERC Jurisdictional Entity, but may be a party operating on behalf of a FERC Jurisdictional Entity, prior to performing any installation, update or upgrade activities of or with regards to a Software Object on a computer system. A cloud-based service provider, such as Amazon, or another similar party, may perform Software Object Verification as a Responsible Entity on behalf of a FERC Jurisdictional Entity.

As used herein, the term "End User" means the party executing the SAG Software and responding to prompts, and who is working on behalf of the Responsible Entity to perform Software Object Verification.

As used herein, the term "Software Source Originator" means the party proclaiming to be the originator and authorized distributor and licensor of a Software Object, i.e., the Software Object author and/or publisher. The "Software Source Originator" is one of the three Software Object Supply Chain entities.

As used herein, the term "Software Source" means the party that made the Software Object available to the Responsible Entity, typically this may be the same party that is identified as the Software Source Originator, but may be a cloud-based distributor, such as Amazon or GitHub or another Software Source provider. The "Software Source" is another one of three Software Object Supply Chain entities, that are collectively referred to as the Supply Chain.

As used herein, the term "Software Source Location" means the physical location where the Software Object was obtained from, e.g., name of Internet server/URL, Amazon store, USB thumb drive or CD-ROM provided by the Software Source, etc. The "Software Source Location" is another one of the three Software Object Supply Chain entities.

As used herein, the term "Digital Signature Algorithm" means a determination made by the SAG Software of the digital signature algorithm used on a signed Software Object.

As used herein, the terms "SAG Proof of Verification" and "SAGPOV," used interchangeably, mean a human readable text produced, e.g., by a SAG Server System, showing summarized evidence of a SAG verification result, which is intended for use in a change management system or transaction log of system changes.

As used herein, the term "F850CR" means a FERC 850 Compliance Record, which is tamperproof, and is a file that contains all of the results of the executions of the SAG Software which were used to verify the identity or authenticity of a Software Supply Chain and to verify the integrity of the Software Object obtained from the Software Supply Chain.

As used herein, the term "TF850CR Report" means a human readable report containing all of the contents of a tamperproof F850CR record, which is digitally signed using the SAG Server private key, and which may be presented to an auditor as proof of compliance.

As used herein, the term "SAGScore" means a statistically calculated value used to indicate an amount of trust in a Software Object and its Supply Chain that has undergone the verification methods of the SAG Software, wherein a value of 0 indicates no trust and a value of 1 indicates complete trust, and wherein all values between 0 and 1 indicate varying levels of trustworthiness. The term "SAGScore" is a trademark of the Applicant named herein.

As used herein, the term "Compliance Report" means a summarized report listing a set of TF850CR Report results based on a date range or other filtering logic requested by the End User.

As used herein, the term "List of Trusted Software Objects" means a SAG Server datastore containing the cumulative results of all SAG Software executions worldwide, wherein trusted items are clearly identified and flagged accordingly.

As used herein, the term "Operating Parameters" means information provided by the SAG Software (which may be located on the SAG Server as described hereinafter) to carry out complete and thorough integrity and authenticity verification by the SAG Software (i.e., background check level of analysis) and contribute to the calculation of a SAGScore.

The following detailed disclosure of exemplary embodiments of the present invention is directed to the detection of potential cyber vulnerabilities through the application of software integrity and authenticity verification methods, described herein, in accordance with NERC CIP-013-1 and CIP-010-3 as mandated by FERC Order 850, and to facilitate the reporting of qualifying "attempts to compromise"

cybersecurity incidents in accordance with NERC CIP-008-6, as mandated by FERC Order 848 and Docket No. RD19-3-000, and to other related functions performed by the SAG Software as described and illustrated herein.

Figure 5A:
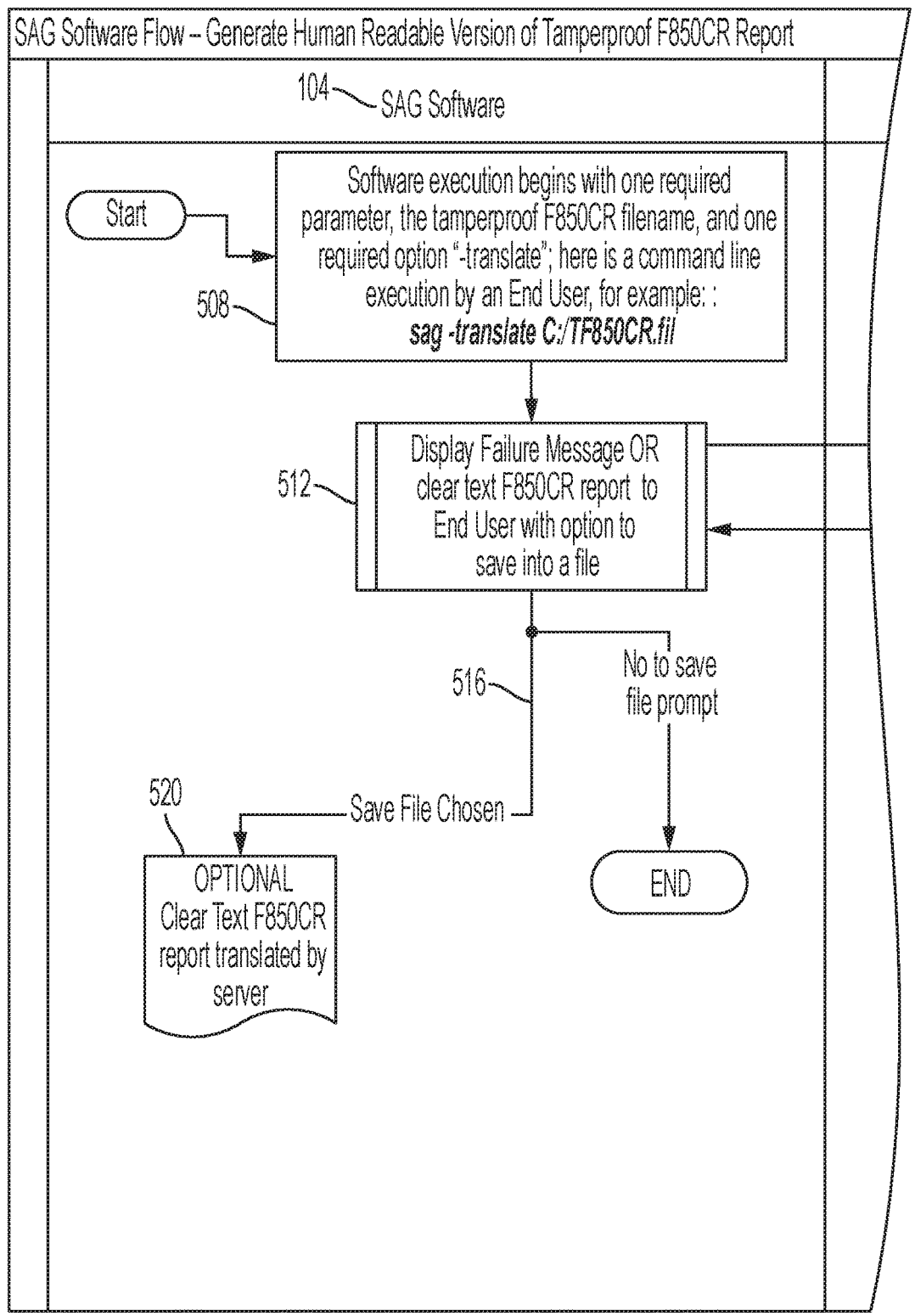
FIGS. 5A and 5B, is a flowchart diagram of a method used to create a human readable version of a tamperproof F850CR record, according to one or more embodiments of the present invention.
Figure 5B:
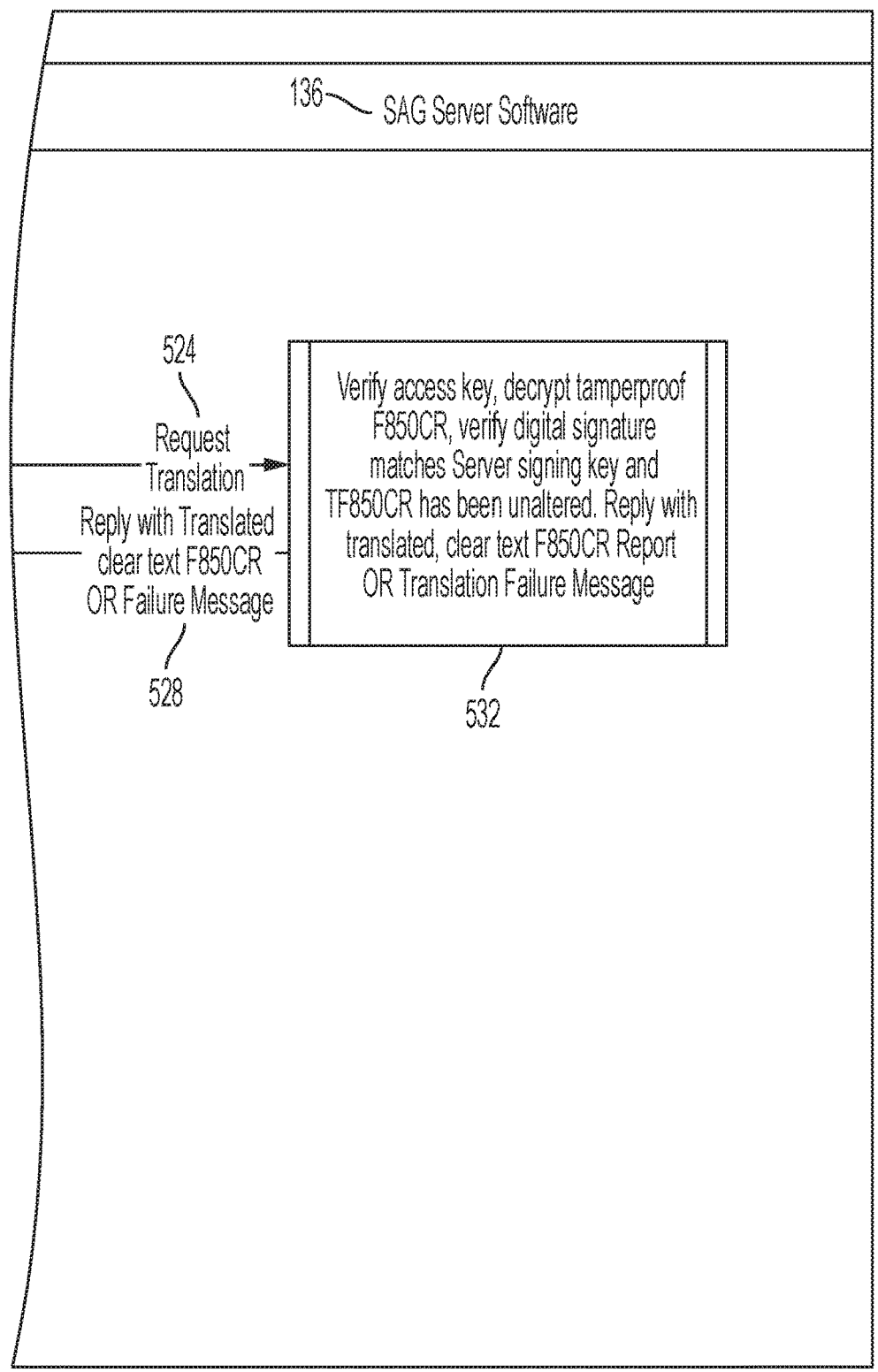
Figure 6:
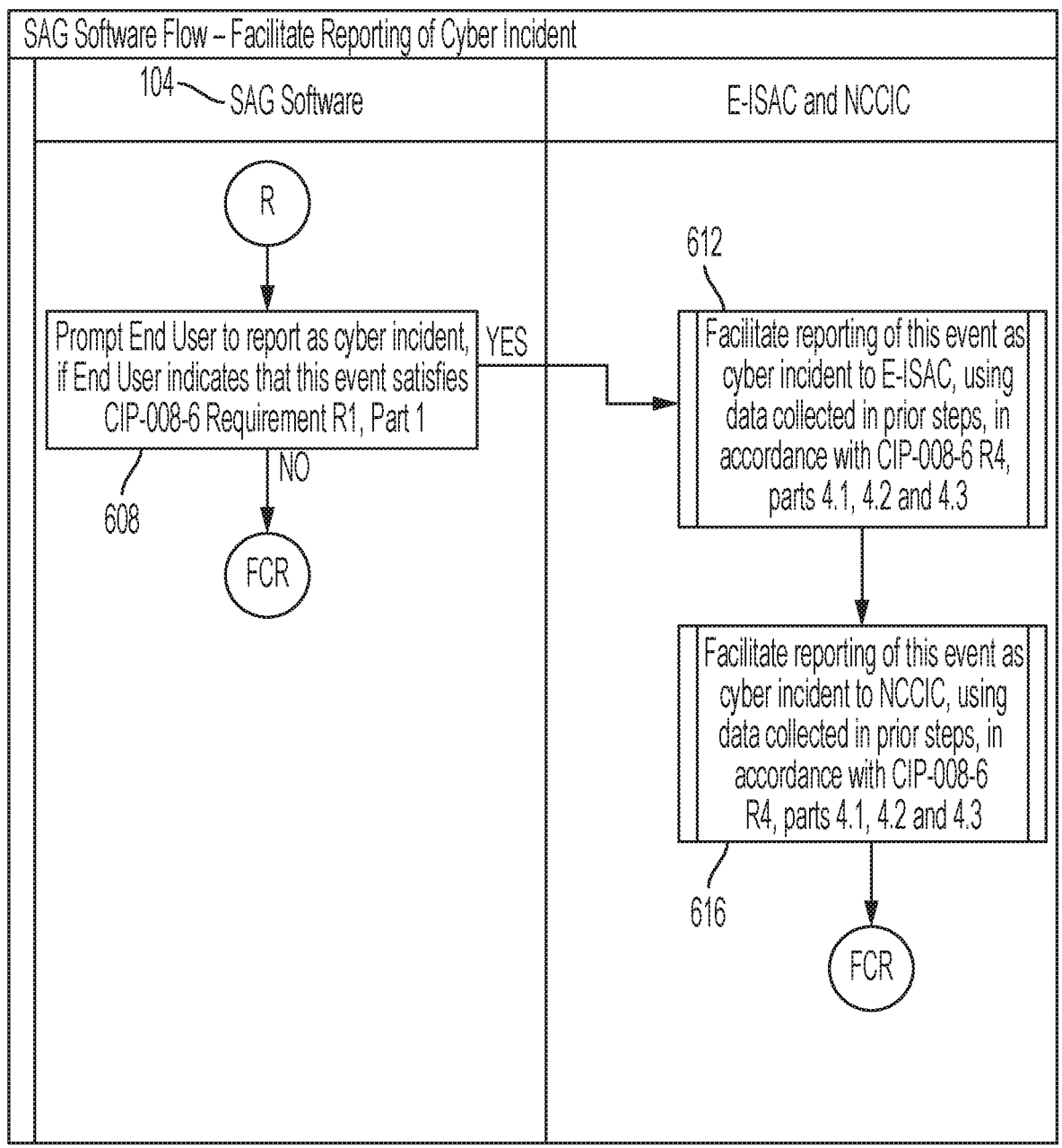
FIG. 6 is a flowchart diagram of a method used to facilitate the reporting of an "attempt to compromise" cyber incident in accordance with CIP-008-6, according to one or more embodiments of the present invention.
Figure 7:
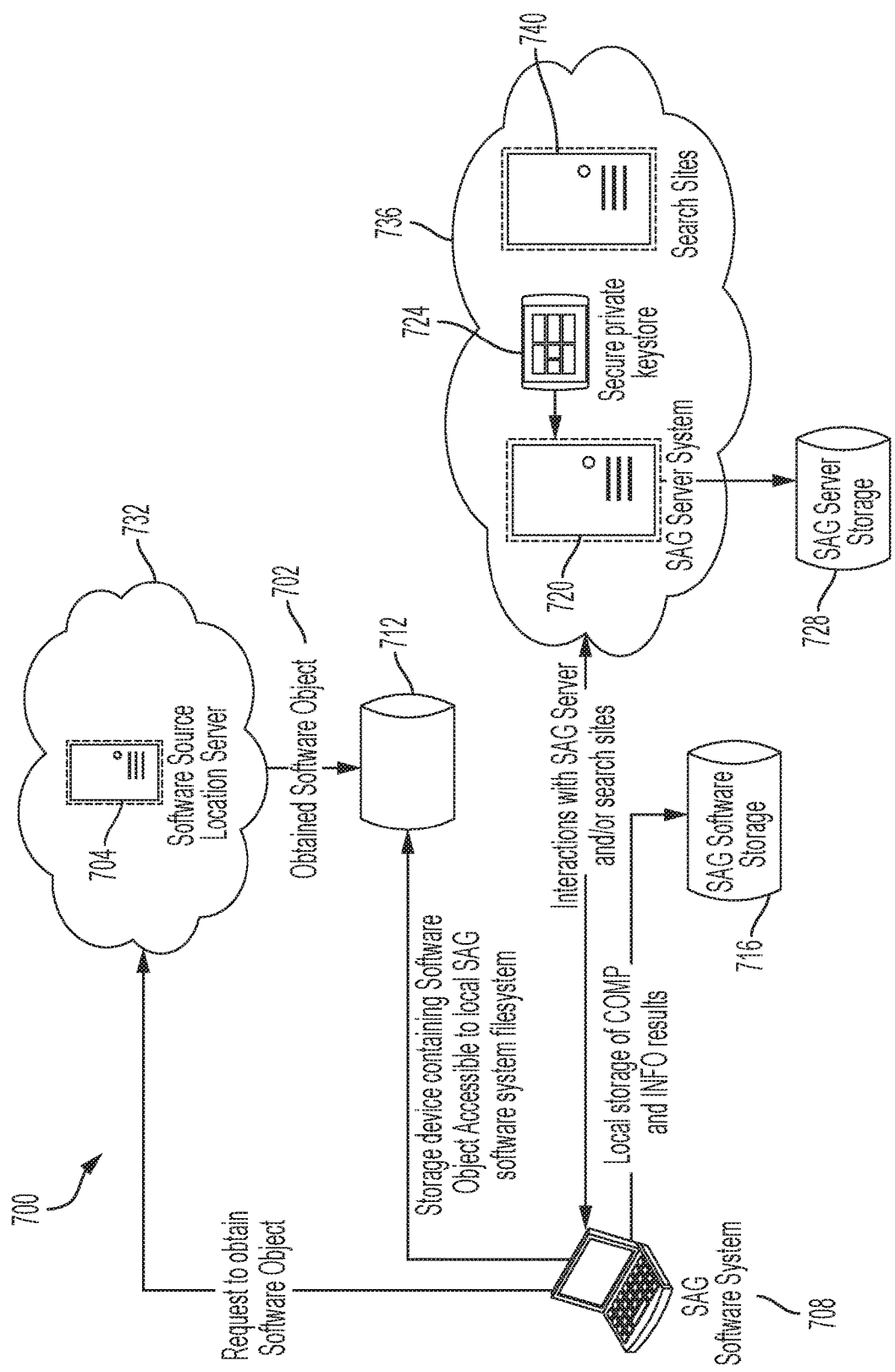
FIG. 7 is a block diagram of a system that includes a computer or processor that may execute the flowchart diagrams of FIGS. 1-6, according to one or more embodiments of the present invention.

Referring to FIG. 7, there illustrated is a block diagram of a system 700 that includes computer and/or processor components that execute the flowchart diagrams of FIGS. 1-6, according to one or more embodiments of the present invention. In FIG. 7, external to the various Software Object integrity and authenticity verification methods described and illustrated herein in accordance with exemplary embodiments of the present invention, a party (i.e., an End User) using the SAG Software to verify the integrity and authenticity of a Software Object 702 first obtains the Software Object 702 to be verified from its Software Source Location 704 (e.g., a server 704, which may be located in a cloud 732), and transfers the Software Object 702 onto a storage device 712 that is accessible by a computer system 708 (e.g., a laptop or other type of computer 708) where the SAG Software will execute. Several exemplary methods are available to transfer the Software Object 702 from the Software Source Location 704, which may be vendor designated, onto the storage device 712, including, but not limited to, Internet data transfer technologies (e.g., HTTP, FTP, SSH, etc.), removable media (e.g., USB thumb drive, CD-ROM, magnetic tape), and any yet to be discovered methodologies that are capable of reliably transferring data from a Software Source Location 704 onto the storage device 712. Jurisdictional Entities are required to adhere to guidance from the NATF to obtain a Software Object 702 from the Software Source Location Server 704. The computer 708 is typically not part of an electric utility company's BES system, but instead is usually located at the gateway to a BES system.

Figure 1B:
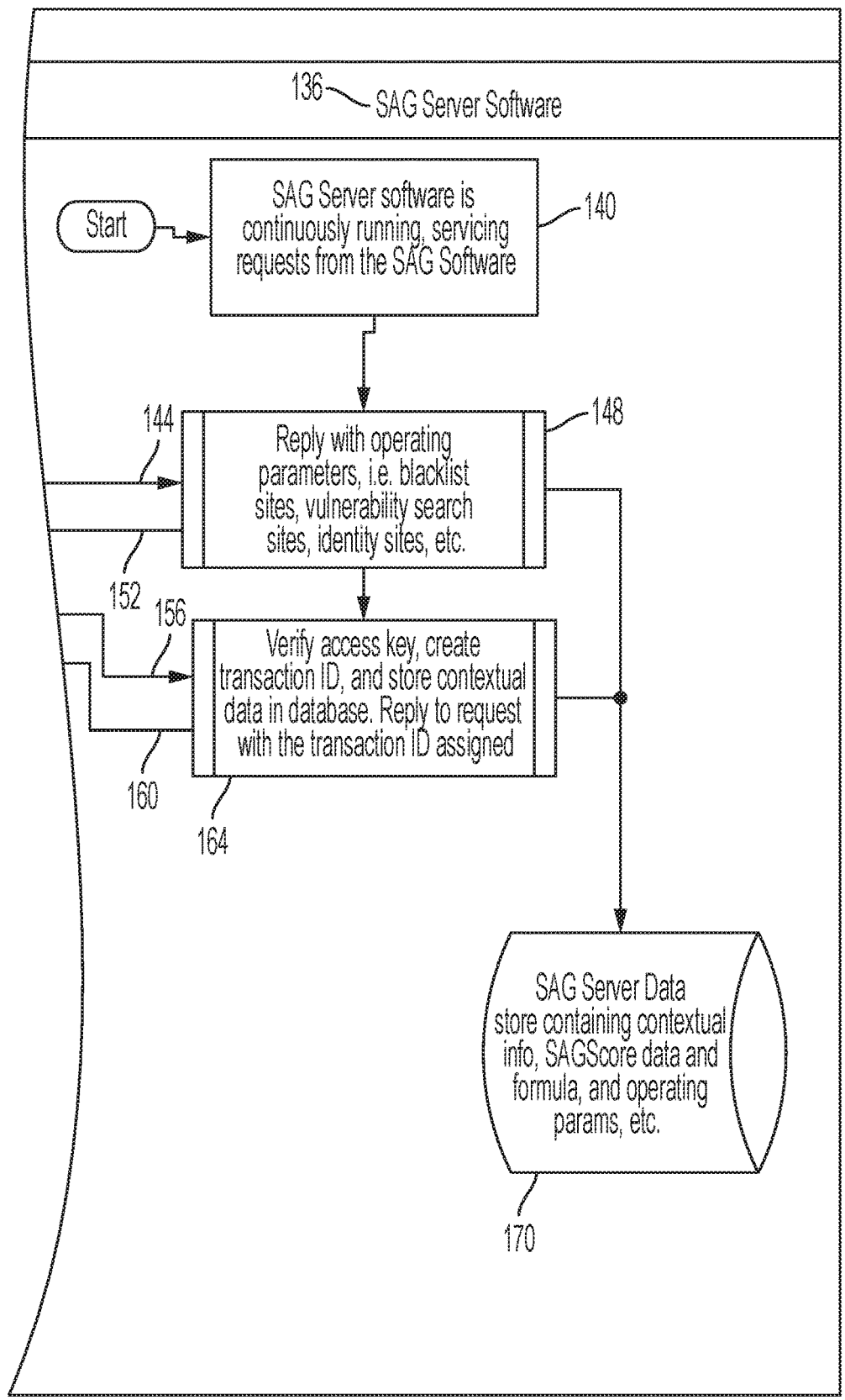

Referring also to FIG. 1, which includes FIGS. 1A and 1B taken together, a flowchart diagram illustrates an exemplary embodiment of the present invention of steps in a method that initiates the Software Object 702 and Supply Chain integrity and authenticity verification methods described and illustrated in greater detail hereinafter. The initiation method illustrated in FIG. 1 may be embodied in SAG Software 104 and SAG Server Software 136 in exemplary embodiments. The SAG Software 104 and the SAG Server Software 136 may operate collaboratively in a client/server, distributed system implementation. The SAG Software 104 may execute or run on the SAG Software System 708 (e.g., the laptop computer 708), while the SAG Server Software 136 may execute or run on the SAG Server System 720, which may be located within a cloud 736 (FIG. 7) as part of the system 700. SAG Software 104 execution begins when an End User invokes the SAG Software 104, which begins with a step 108 that performs a validation check of the passed parameters to verify that the minimum number of parameters was provided, along with any optional parameters, which are verified against a list of acceptable options, listed in Table 3 herein.

The SAG Server System 720 illustrated in FIG. 7 may contain secure access control mechanisms to prevent unauthorized access to the SAG Server System 720 and the functions provided by the SAG Server Software 136. The SAG Software System 708 may also contain secure access control mechanisms to prevent unauthorized access to the SAG Software System 708 and the functions provided by the SAG Software 104. All interactions between the SAG Software 104 and the SAG Server Software 136 are secured via an appropriate access control mechanism available within each System 708 and 720.

At step 110 in FIG. 1, the SAG Software 104 constructs and sends a request message 144 to the SAG Server Software 136 to retrieve the initial set of operating parameters needed to properly execute the SAG Software 104. All communications (e.g., message 144) between the SAG Software 104 and the SAG Server Software 136 may occur over a secured communication channel using SSL or TLS technology as appropriate, with a minimum key size of 2048 bits, or greater, for asymmetric cryptographic algorithms required for SSL/TLS initial handshakes and key exchange, and with a minimum key size of 128 bits, or greater, for symmetrical encryption/decryption algorithms supported within SSL and/or TLS to encrypt/decrypt the SAG message portion of each Internet packet for the message exchange to complete successfully.

Next, the SAG Server Software 136, upon receipt of message 144, retrieves all available operating parameters from the persistent SAG Server Storage 728 (FIG. 7) in a step 170, which includes information needed by the SAG Software 104 to perform blacklist verification, vulnerability searches, anti-virus/malware (malicious software) scanning, Software Object 702 integrity verification, Software Object 702 authenticity verification, SAGScore calculation, monitoring and reporting of cyber security incidents, and other information required to access information stored on the Internet and/or locally on the SAG Software System 708, to carry out the verification methods described herein. This information is packaged in a step 148 by the SAG Server Software 136 into message 152 which is sent to the SAG Software 104 in reply to request message 144. Upon receipt of the operating parameters from the SAG Server Software 136 in reply message 152, the SAG Software 104 decomposes the received message 152 into the data items needed by the SAG Software 104, which will be stored in the SAG Software System memory storage 716 (FIG. 7) for use throughout execution of the SAG Software program 104.

At step 112, the SAG Software 104 constructs a request message 156 which is sent to the SAG Server Software 136, which issues a unique transaction ID that is sent as a reply message 160 to the SAG Software 104. Upon receipt of message 156, the SAG Server Software 136 at step 164 utilizes system functions to generate a globally unique identifier ("GUID") to serve as the transaction ID. This transaction ID, along with other contextual information related to this transaction ID, is stored in the step 170 in the SAG Server Storage 728, including information identifying the party that is registered to utilize the SAG Software 104, based, for example, on an access key associated with the date and time of the request, the transaction ID itself, and other contextual information relating to the verification methods implemented by the SAG Software 104, i.e., the SAG Software version, etc. The SAG Software 104, upon receipt of reply message 160, in step 112 decomposes the information contained in the reply message 160 and stores this information in local memory 716 for use throughout SAG Software 104 execution.

At step 116, an inspection is performed on the Software Object 702 being verified to determine characteristics about the Software Object 702, such as size of the Software Object 702 in bytes, creation date, last modified date, information pertaining to the author of the Software Object 702 (a/k/a Software Source Originator) and other identifying characteristics that can be ascertained from inspecting the properties of the Software Object 702. The collected information, referred to as a "Software Bill of Materials" ("SBOM") is used to drive the SAG risk assessment process and for identification purposes within the F850CR record describing the Software Object 702. Also at step 116, the End User executing the SAG Software 104 is prompted to input additional information that is used by the integrity and authenticity verification methods, including, for example, the Software Source Location 704 where this Software Object 702 was acquired from on the Internet, or via other means, including traditional merchant purchases which result in the delivery of a Software Object 702 on a transferable medium, such as CD-ROM, USB Thumb drive, or any other means by which a Software Object 702 may be transferred from a Software Source Location 704 to the SAG Software System 708. Additional information provided by the End User in step 116 includes other items which may not be ascertained by inspecting the Software Object 702, such as name of the Software Source Originator (company or person), country of origin and address information, software product name, version, build identifier, name of party operating the Software Source Location 704 where the Software Object 702 was acquired from (e.g., Internet URL, Amazon store, Github, etc.), and the method used to acquire the Software Object 702 (e.g., Internet Download using HTTP, FTP, etc., email attachment, traditional software purchase and delivery via traditional transport—FedEx, etc.), and other information that is needed to perform the methods described herein to perform integrity and authenticity verification and produce the tamperproof F850CR, the informational F850CR and SAGPOV outputs, and other supporting functions. Reference may be made to Tables 1 and 2 herein for a complete list of information that may be provided by the End User and/or determined through electronic means, such as search results and software inspection. It is during this Software Object inspection step 116 that the SAG Software 104 determines if a Software Object 702 contains a digital signature that may be used to cryptographically verify that a Software Object 702 has not been altered from its original form, as provided by the Software Source Originator, and the cryptographic identifier (e.g., X.509 certificate information) of the Software Source Originator contained in the digital signature. All of the gathered information is used throughout the various methods described and illustrated herein to verify Software Object 702 and Supply Chain integrity and authenticity.

An integral part of the Software Object 702 integrity verification method of exemplary embodiments of the present invention is performed in step 120 to determine if the Software Object 702 to be verified contains any known vulnerabilities that are detectable by commercially available anti-virus/malware scanning programs that are available for execution on the SAG Software System 708, and which may be invoked by the SAG Software 104. The SAG Software 104 may invoke the anti-virus/malware scanning program against the Software Object 702 located on the storage device 712 (FIG. 7) to determine if any known malware is present or embedded in the Software Object 702. The detection of any malware present within the Software Object 702 by the anti-virus/malware scanning software will result in a branch at step 132 to step 608 in FIG. 6, and no further verification will be performed by the SAG Software 104 as this Software Object 702 will be deemed to have failed the integrity verification method due to the presence of malware.

At step 122, a decision is made to either apply digital signature cryptographic verification technologies at step 124, resulting in a branch to step 204 in FIG. 2, or to apply manual techniques at step 128, resulting in a branch to step 304 in FIG. 3, to continue the integrity and authenticity verification methods.

Figure 2A:
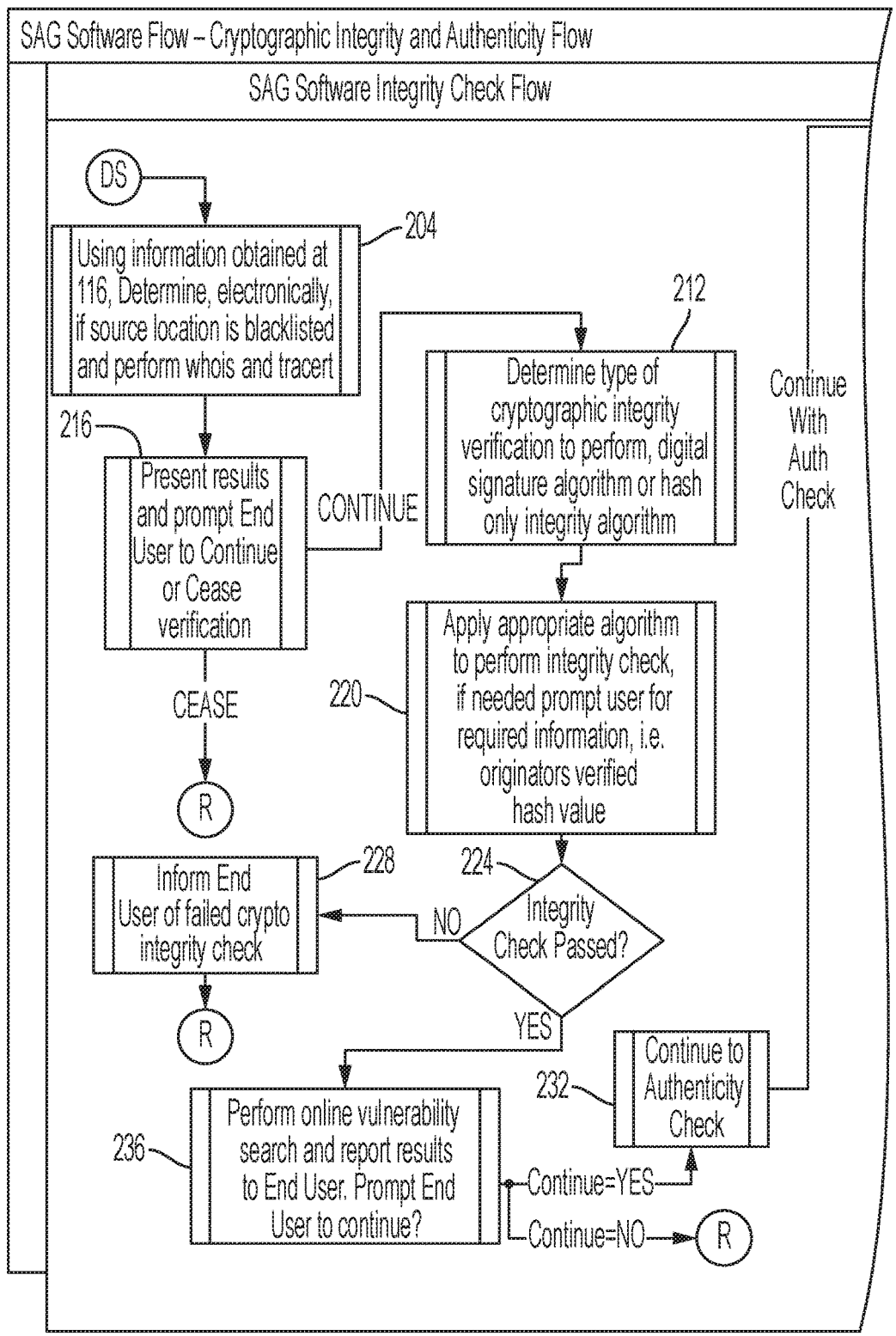
FIGS. 2A and 2B, is a flowchart diagram of a method used for cryptographic integrity and authenticity verification of a Software Object and its Supply Chain, according to one or more embodiments of the present invention.
Figure 2B:
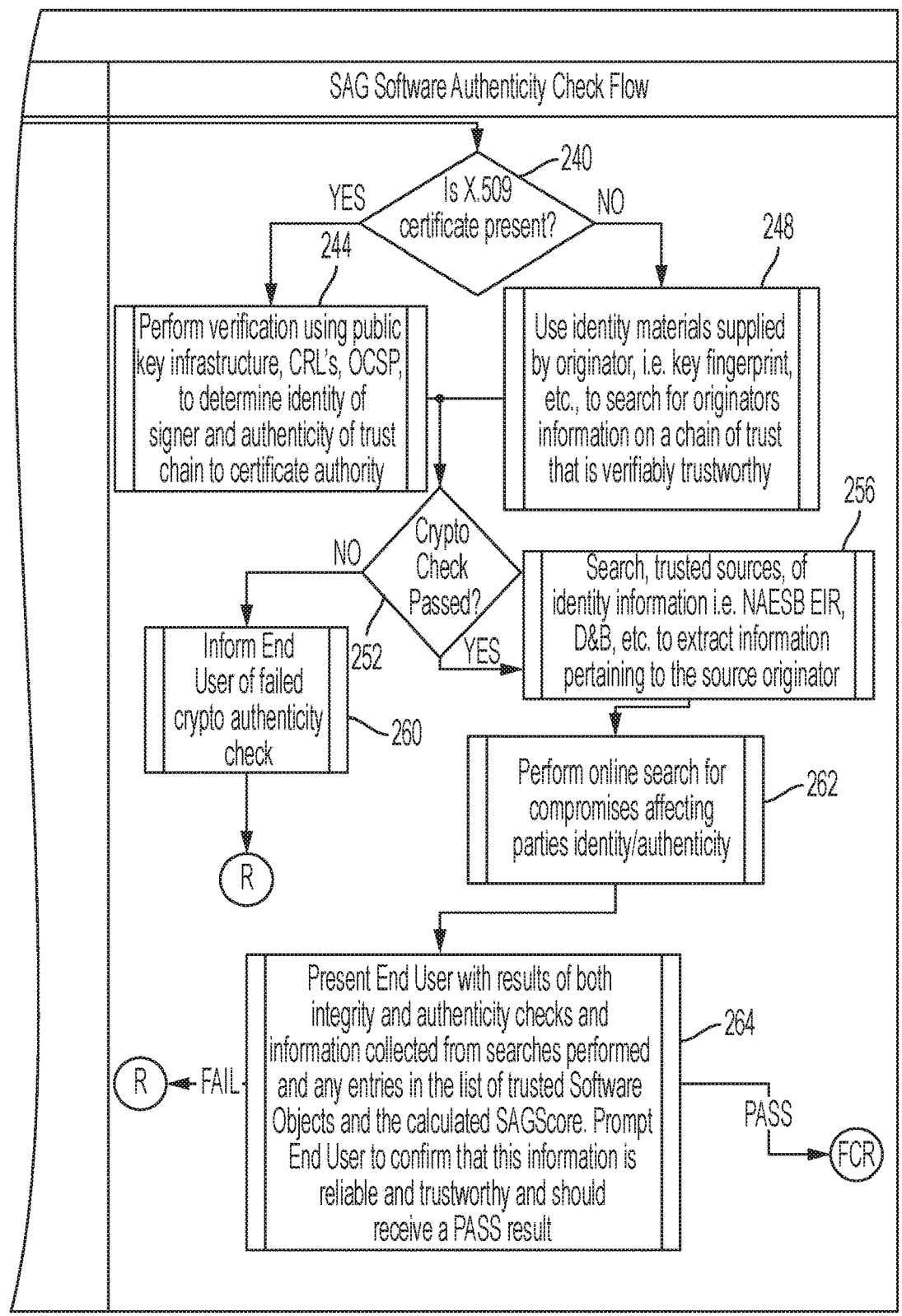

Referring to FIG. 2, which includes FIGS. 2A and 2B taken together, a flowchart diagram illustrates an exemplary embodiment of the logic flow and methods used for cryptographic integrity and authenticity verification of a Software Object 702 and its Supply Chain according to the present invention. More specifically, the steps illustrated in FIG. 2 describe an exemplary integrity and authenticity method when a digital signature has been detected at step 116 in the flowchart diagram of FIG. 1.

At step 204, the SAG Software 104 invokes an online search to determine if the Software Source Location 704 has been flagged as untrustworthy via a blacklist listing. Information on where and how to search for blacklisted sites was obtained at step 110 in FIG. 1 in message 152. If the Software Source Location is accessible via the Internet, a whois lookup and tracert is performed in step 204 using the information contained in the URL. The results of this whois lookup, tracert and the online blacklist search (i.e., an example of a verification of the authenticity and integrity of the Supply Chain) are presented to the End User in a step 216 for the End User to decide whether or not to continue with the verification process. If the End User chooses to continue with the verification process, then processing illustrated in the method of FIG. 2 continues at step 212. Instead, if the End User chooses to stop the verification process, then processing proceeds to step 608 in FIG. 6 where the End User will be asked to file this as a cyber incident, in accordance with NERC CIP-008-6.

At step 212, information about the digital signature technology associated with the Software Object 702 that was obtained in step 116 in FIG. 1 is presented to the End User for confirmation to proceed with the cryptographic integrity check at step 220. According to exemplary embodiments of the present invention, the SAG Software 104 supports multiple forms of digital signature algorithms and formats including, but not limited to, Digital Signature Algorithm ("DSA"), RSA based alternatives, and any other digital signature algorithms and formats that are associated with Software Objects 702 that are required to comply with NERC CIP-013-1 Requirement R1, Part 1.2.5, and NERC CIP-010-3 Requirement R1, Part 1.6.

At step 220, the appropriate digital signature technology is used to verify the integrity of the Software Object 702 in accordance with NERC CIP-010-3 Requirement R1, Part 1.6, requirement 1.6.2: "Verify the integrity of the software obtained from the software source." Any missing information required to complete a cryptographic integrity check will be provided by the End User via a series or prompts, such items may include, but are not limited to, a vendor supplied hash value or specific instructions pertaining to the cryptographic technique to apply. The results of the Software Object 702 integrity check are obtained from this cryptographic process in step 220.

At step 224, a decision is made based on the results of the Software Object 702 integrity check in step 220. If the integrity check passed, then processing continues with step 236, which searches for reported vulnerabilities, as described in more detail hereinafter. If the integrity check failed, then processing continues with step 228 where the failure result is reported to the End User and processing branches to step 608 in FIG. 6.

At step 236, the SAG Software 104 searches the Internet for any reported vulnerabilities for this particular Software Object 702 using the information obtained in step 116 in FIG. 1 and the results of the integrity check performed at step 220 in this FIG. 2. An example of some sites that may be searched for vulnerability reports include, but are not limited to, E-ISAC, NCCIC, Mitre CVE, SANS Vulnerability listing, Google, and others as appropriate. Also, as part of the vulnerability search of step 236, the SAG Software 104 will search the SAG Server list of trusted Software Objects 702 for any cases where the particular Software Object 702 may already have been trusted by others. The results of this vulnerability search and trusted Software Objects 702 search will be presented to the End User along with a prompt to continue, and to accept the results as trustworthy in this step 232, and then continue with authenticity verification in step 232, or instead to raise concerns over the results and cease further verification, resulting in a branch to step 608 in FIG. 6.

At step 240, the SAG Software 104 uses information in the digital signature to determine if an X.509 digital certificate is associated with the signature. When a X.509 certificate is present, processing continues to step 244 where conventional public key infrastructure ("PKI") tools and techniques are used to validate the X.509 certificate and the subject owner information through CRL's and/or OCSP searches and verification of the signature chain back to the issuing Certificate Authority to determine if this signature chain is trustworthy, i.e., it follows accepted industry best practices for integrity and authenticity of a subscriber's X.509 certificate and their associated credentials, such as NAESB's WEQ-012 standard, or a similarly well regarded organization espousing such business practices, such as NIST or the CAB/Forum. X.509 certificates that are self-signed by a party or are signed by known parties that have not demonstrated adherence to best practices, by passing an audit of their process with an "unqualified passing result," shall be deemed untrustworthy and processing continues at step 252. A list of Trustworthy Certificate Authority parties is maintained in the SAG Server System 720 (FIG. 7) and is provided to the SAG Software 104 at step 110 in FIG. 1 in message 152, to be used in step 244.

At step 248, no X.509 certificate is available; however, a digital signature appears to be present. The secret key used to produce the Software Object 702 digital signature has a corresponding public key that can be used to verify the authenticity of the signing party using other methods, such as a PGP chain of trust or the signing party is well known by the Jurisdictional Entity and a separate trust bond is formed through the exchange of public keys and key fingerprints that directly link a known Software Source Originator's signing key to their trusted identity. The End User is prompted in step 248 for information about the signer and the key fingerprint, i.e., is there a trusted relationship between the signing key and the party claiming to be the Software Source Originator which can be trusted, as is the case in the Natural Gas Industry, WEQ Electronic Delivery Mechanism (EDM) standards. If no trust relationship has been established between the Software Source Originator and the Jurisdictional Entity, then a chain of trust search is initiated on the Internet using sites provided by the SAG Server Software 136 in message 152 in FIG. 1 and processed by the SAG Software 104 at step 110 in FIG. 1, using the name of the Software Source Originator, the key fingerprint and other identifying materials. The results of this processing in step 244 are presented to the End User and processing resumes at step 252.

At step 252, the End User is presented with the results from either step 244 or step 248 and is prompted to PASS or FAIL the verification based on the information presented. By choosing a FAIL result, the method of FIG. 2 continues to step 260 which branches to step 608 in FIG. 6 for final processing. Instead, if the End User responds with a PASS result, processing continues to step 256.

At step 256, the SAG Software 104 uses information provided by the SAG Server Software 136 in message 152 from step 110 in FIG. 1 to determine which Internet identity search sites may be used to search for registered credentials that will verifiably confirm the Software Source Originator's identity and their credentials used in the digital signature, along with the identity of the Software Source. Example search sites include NAESB's EIR, Dun and Bradstreet, and other sites which may become known as trusted sources for determining the authenticity of the party who has applied a digital signature to the Software Object 702.

At step 262, using the information obtained in steps 110 and 116 in FIG. 1, the SAG Software 104 performs an online search for known compromises to the proclaimed Software Source Originator's credentials and the identity of the Software Source, and/or operating controls that are used to protect their software Supply Chain processes from vulnerabilities and other compromises.

Next, information gathered in steps 240, 244 and 248 may be used to verify credentials against information found in these identity search sites, and the results of this comparison along with other information collected through the integrity and authenticity methods outlined herein are presented to the End User, along with the calculated SAGScore, at step 264 where the End User is prompted to assign a final result of PASS or FAIL for both the authenticity and integrity verification results. A PASS result will cause processing to branch to step 404 in FIG. 4, while a FAIL result will cause processing to branch to step 608 in FIG. 6.

In exemplary embodiments of the present invention, a SAGScore may be a statistically determined or calculated value that is used to indicate an amount of trust in a Software Object 702 and its Supply Chain which has been acquired from a Software Source Location (e.g., downloaded from the Software Source website) and which may be trusted to an extent to be installed in a system such as a BES or other cyber assets used within critical infrastructure. Prior to such installation, the Software Object 702 and its Supply Chain undergo the integrity and authenticity verification risk analysis methods of the SAG Software, wherein a value of 0 indicates no trust in the Supply Chain and the Software Object 702, while a value of 1 indicates complete trust in the Supply Chain and the Software Object 702, and wherein all values between 0 and 1 (or between 0 and 100 if the SAGScore is multiplied by 100, as discussed herein) indicate varying levels of trustworthiness in the particular Software Object 702 and its Supply Chain. For example, a rule may exist where a Software Object 702 and its Supply Chain having a SAGScore less than, e.g., 0.85 should not be trusted and, thus, the particular Software Object 702 should not be installed in a BES, as it poses a risk or threat to the proper operation of the BES. In practice and for ease of use and understanding, the determined or calculated SAGScore may be multiplied by 100, such that in the above example, a SAGScore of less than 0.85 becomes a SAGScore of less than 85. In turn, the exemplary rule noted above then becomes "a rule may exist where a Software Object 702 and its Supply Chain having a SAGScore less than, e.g., 85 should not be trusted . . . ".

According to exemplary embodiments of the present invention, an algorithm embodied in the SAG Software that calculates or determines the SAGScore may perform a number of thorough investigative steps or risk assessments with respect to a Software Object 702 and its Supply Chain, as determined by characteristic information about the Software Object 702 and its Supply Chain provided by the results of the integrity and authenticity verification methods of the SAG Software. The steps in the SAGScore algorithm may be carried out over a number (e.g., seven) of categories of control functions associated with a Software Object 702, with a number (e.g., 22) of independent risk factors being embodied in these control functions. The risk factors have weights assigned to them which may be adjusted as necessary. The overall SAGScore for a particular Software Object 702 and its Supply Chain may be calculated or determined from the information provided by the risk factors after the integrity and authentication verification methods have been run. Essentially, the higher the amount of overall potential risk to the BES posed by the Software Object 702 and its Supply Chain and embodied in the risk factors, the lower the SAGScore will be. In addition, the algorithm may apply corroborating evidence throughout the risk analysis to determine risk levels.

In an exemplary embodiment, the seven areas of control functions relating to a Software Object 702 and its Supply Chain being evaluated for potential use in a BES may comprise: (1) Source Location Sever Identity and SSL Certificate Validation against "Accredited Certificate Authorities"; (2) Evaluate the path used to acquire a Software Object 702 for possible man-in-the-middle attacks, blacklisted sites and geographic locations that may belong to entities hostile to the United States; (3) Introspection of a Software Object's installation package resulting in a SBOM, for indications of potential risk in an attempt to categorize the package as safe or unsafe, based on known patterns; (4) Extensive vulnerability scan using known and trustworthy vulnerability databases, such as cve.Mitre.org; (5) Verification of vendor credentials and processes to ensure that each vendor in the Supply Chain has been properly vetted and approved as implementing trustworthy business practices and control procedures to protect against any type of taint that may impact the trustworthiness of a Software Object 702; (6) Verification of digitally signed software installation packages to ensure that no changes have occurred since the Software Object 702 was signed by the originator/licensor of the Software Object 702; and (7) Perform a comprehensive malware scan of the software installation package using the state-of-the-art malware inspection tools. The information relating to each of these seven areas of control functions may be provided in the results of the integrity and authenticity verification methods of the SAG Software. The control functions may have differing numbers or amounts of the 22 risk factors. In addition, the list of, e.g., 22 total independent risk factors embodied within these seven control functions may have risk factors added, removed, or updated as necessary as the SAGScore algorithm is improved.

The calculated SAGScore provides timely and accurate information, on an ongoing basis and based on best practices, to enable a Responsible Entity to make a risk-based decision regarding the trustworthiness of a Software Object 702 to perform as expected in its role in a BES or other critical infrastructure cyber asset. The SAGScore also provides an assessment of risk for all parties (e.g., vendors) serving roles with the global software Supply Chain for the particular Software Object 702. This essentially enables the Responsible Entity to readily and confidently decide whether or not to install the Software Object 702 in a BES or other cyber asset used in critical infrastructure.

Figure 3A:
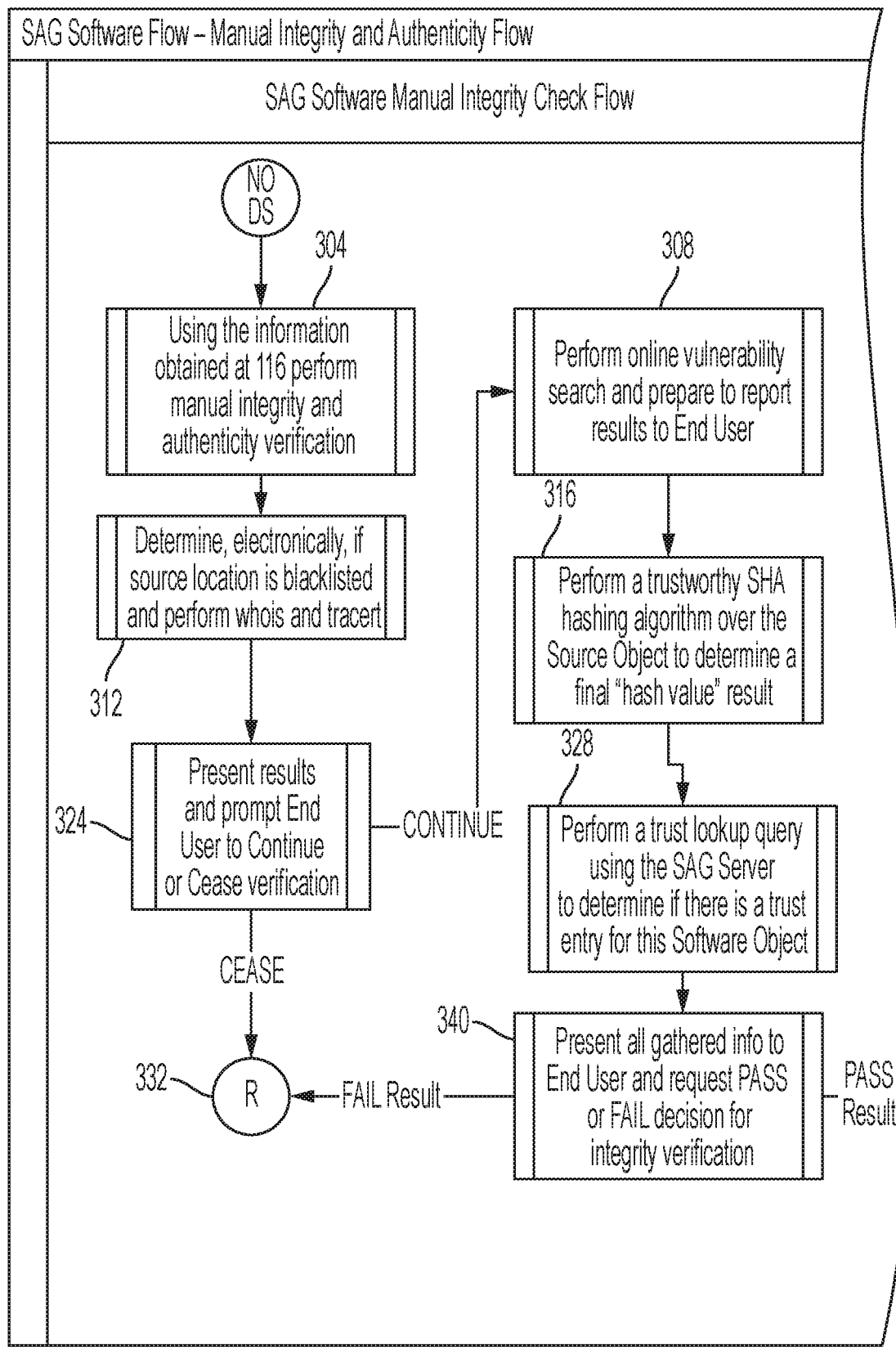
FIGS. 3A and 3B, is a flowchart diagram of a method used for manual integrity and authenticity verification of a Software Object and its Supply Chain, according to one or more embodiments of the present invention.
Figure 3B:
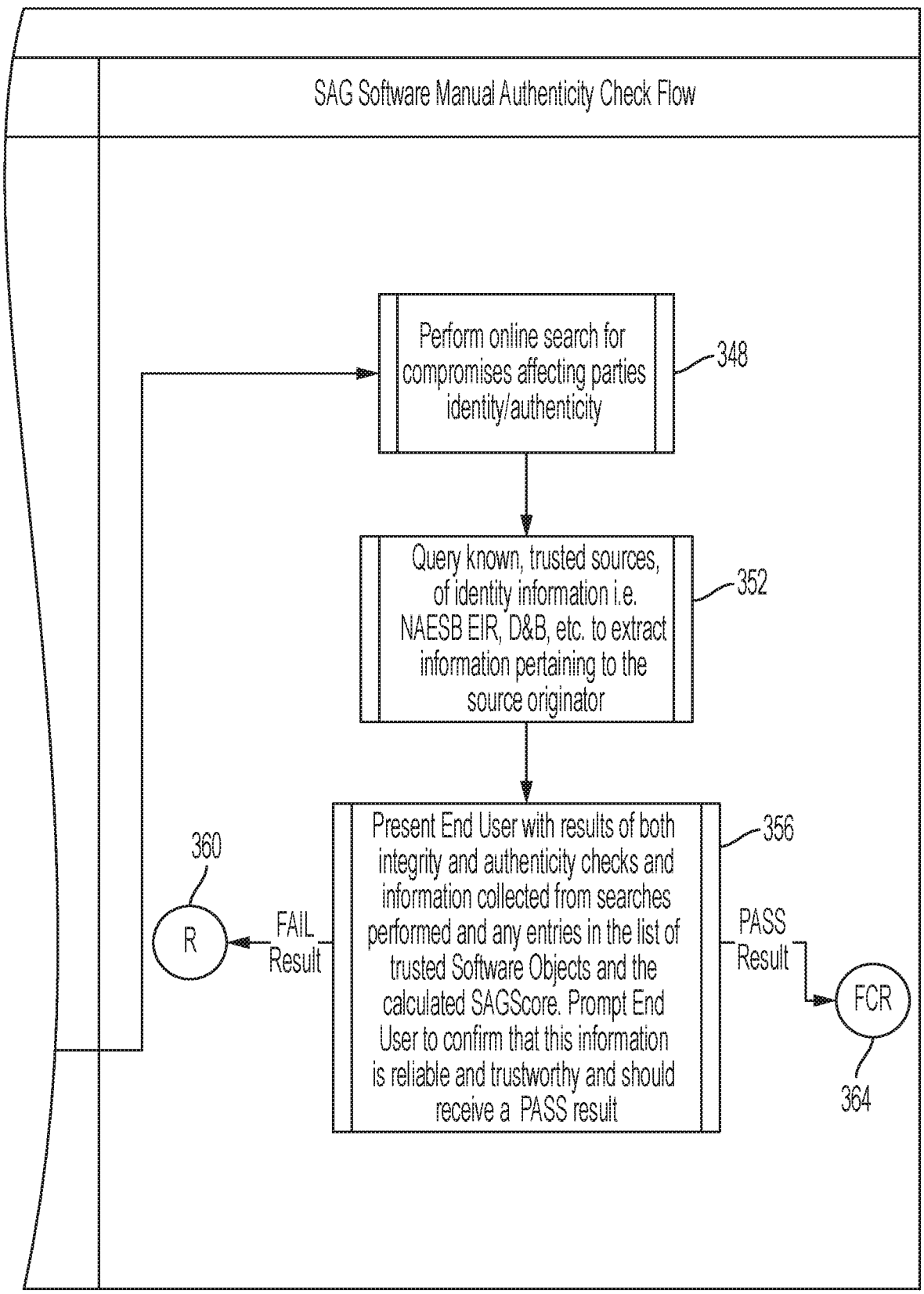

Referring to FIG. 3, which includes FIGS. 3A and 3B taken together, a flowchart diagram illustrates an exemplary embodiment of the logic flow and methods used for manual integrity and authenticity verification of a Software Object 702 and its Supply Chain according to the present invention. More specifically, the flowchart of FIG. 3 illustrates an exemplary method used to verify the integrity and authenticity of a Software Object 702 and its Supply Chain using a manual approach, i.e., when no digital signature is associated with a Software Object 702.

At step 304, the SAG Software 104 uses the information acquired at step 116 in FIG. 1 to initiate the manual integrity and authenticity verification methods without the aid of cryptographic techniques.

At step 312, the SAG Software 104 invokes an online search to determine if the Software Source Location has been flagged as untrustworthy via a blacklist listing. Information on where and how to search for blacklisted sites was obtained at step 110 in FIG. 1 in message 152. If the source location is accessible via the Internet, a whois lookup and tracert is performed using the information contained in the URL. The results of this whois lookup, tracert and the online blacklist search are presented to the End User at step 324 to decide whether to continue with verification. If the End User chooses to continue with verification, processing continues at step 308. Instead, if the End User chooses to cease further verification, processing branches to step 608 in FIG. 6 where the End User will be asked to file this as a cyber incident, in accordance with NERC CIP-008-6.

At step 308, after the End User has chosen to continue with verification, an online vulnerability search is performed using information obtained at step 110 in FIG. 1 in message 152 to search the Internet for any reported vulnerabilities for this Software Object 702 using the information obtained in step 116 in FIG. 1. An example of some sites that will be searched for vulnerability reports include, but are not limited to, E-ISAC, NCCIC, Mitre CVE, SANS Vulnerability listing, Google, and others as appropriate.

At step 316, a SHA-256 hashing algorithm is calculated over the Software Object 702 to produce a unique hash value for this Software Object 702.

At step 328, the SAG Software 104 sends a trust lookup request to the SAG Server Software 136 using the information collected in steps 304, 308 and 312, along with the calculated hash value from step 316. The SAG Server Software 136 uses this information to perform a search of the list of trusted Software Objects 702 maintained by the SAG Server Software 136 and returns the results of this search to the SAG Software 104.

At step 340, the End User is presented with the results obtained from steps 308, 316 and 328 and is prompted to PASS or FAIL the integrity verification, based on the information presented. If the End User chooses FAIL, processing resumes with step 332 and a branch to step 608 in FIG. 6 is performed. Instead, if the End User chooses PASS, processing continues with step 348.

At step 348, using the information obtained in steps 110 and 116, the SAG Software 104 performs an online search for known compromises to the proclaimed Software Source Originator's and Software Source's credentials and/or operating controls that are used to protect their software Supply Chain processes from vulnerabilities and other compromises.

At step 352, the SAG Software 104 uses information provided by the SAG Server Software 136 in message 152 in FIG. 1, obtained at step 110 in FIG. 1, to determine which Internet identity search sites may be used to search for registered credentials that will verifiably confirm the Software Source Originator's and Software Source's identity. Example search sites include NAESB's EIR, Dun and Bradstreet, and other sites which may become known as trusted sources for determining the authenticity of a party proclaiming to the be Software Source Originator or Software Source. Information gathered in steps 116 and 348 may be used in step 352 to verify credentials against information found in these identity search sites.

At step 356, the End User is presented with the results of steps 308, 316, 328, 340, 348 and 352, along with the calculated SAGScore (which is determined or calculated in a similar manner to that as described hereinbefore with respect to FIG. 2), and is prompted to assign a PASS or FAIL result, based on the information presented for both the integrity and authenticity verification results. If the End User chooses FAIL, processing resumes at step 360 and a branch to step 608 in FIG. 6 is performed. Instead, if the End User chooses PASS, processing resumes at step 354 branches to step 404 in FIG. 4.

Figure 4A:
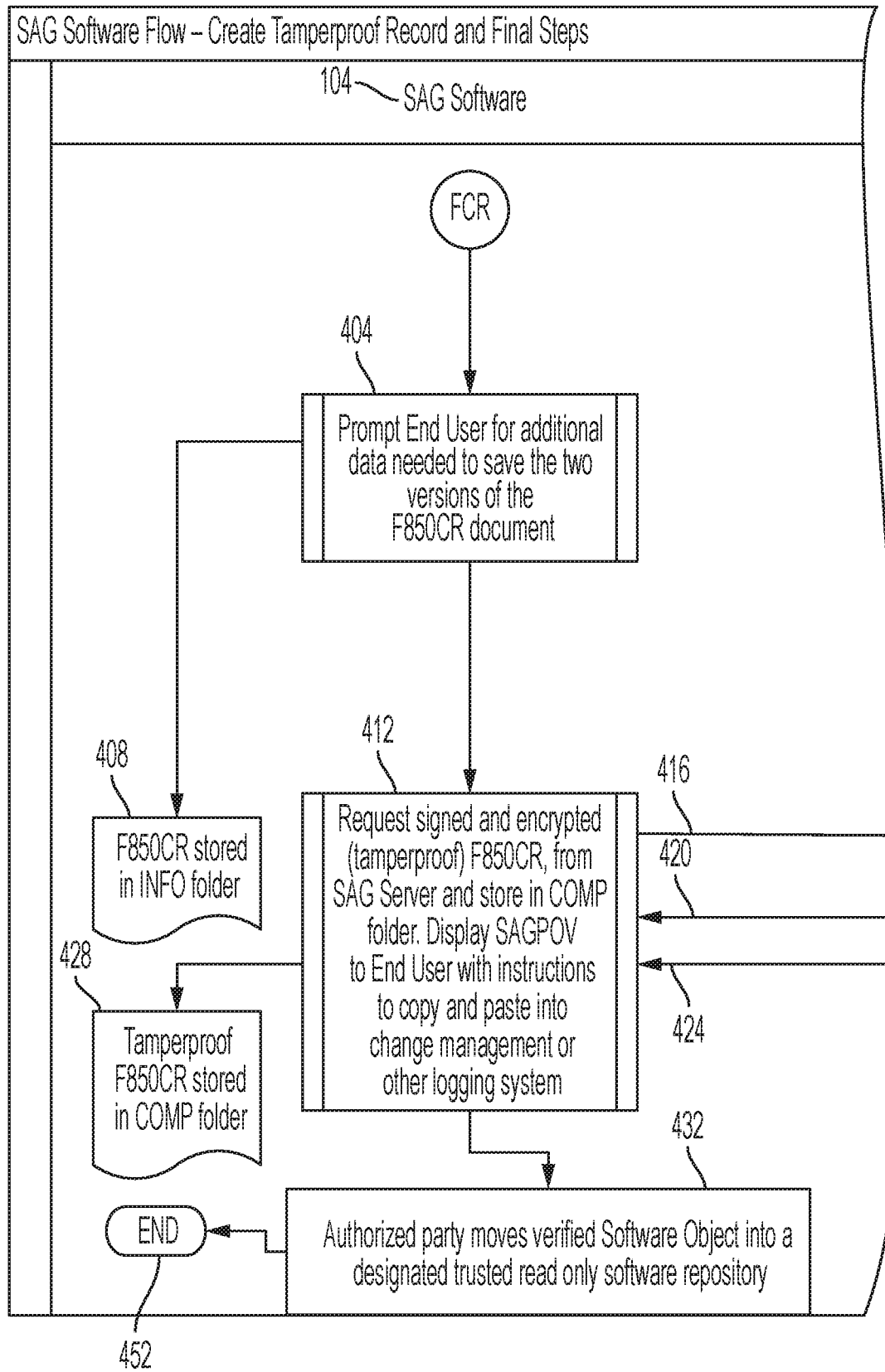
FIGS. 4A and 4B, is a flowchart diagram of a method used to create a tamperproof F850CR record and to update the List of Trusted Software Objects, according to one or more embodiments of the present invention.
Figure 4B:
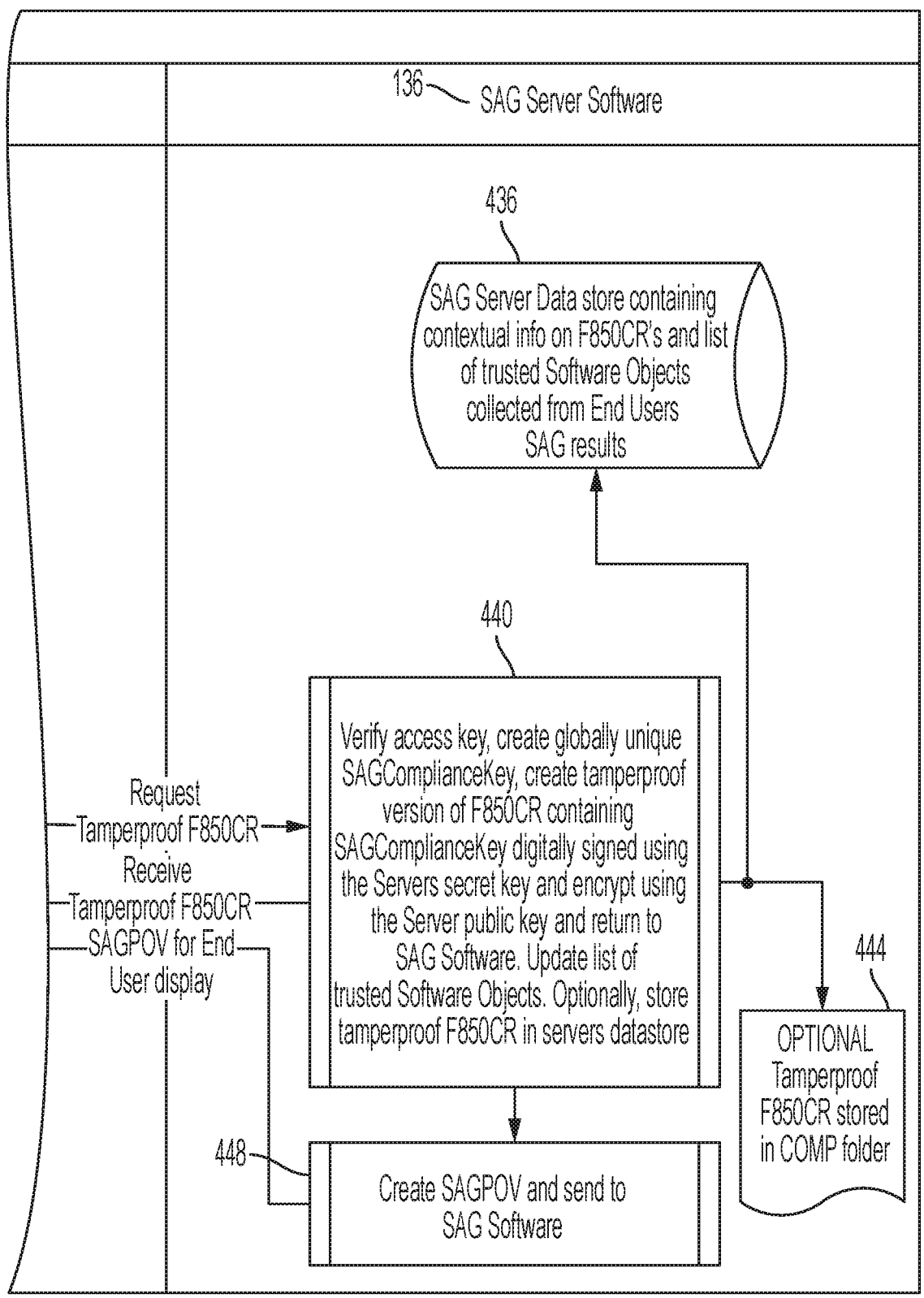

Referring to FIG. 4, which includes FIGS. 4A and 4B taken together, a flowchart diagram illustrates an exemplary embodiment of the logic flow and methods used to create a tamperproof F850CR record and update the List of Trusted Software Objects 702 according to the present invention. More specifically, the flowchart diagram of FIG. 4 illustrates a method used to create and store the informational and tamperproof versions of an F850CR file and display summarized proof of verification that may be applied to a change management or other logging system.

At step 404, the End User is prompted to supply information needed to save the F850CR files on the SAG Software System 708 in the secondary storage 716. The stored information may include a name to assign to these files along with the location where the COMP and INFO folders are located. The End User may choose to save nothing in which case neither F850CR file will be created and processing ends at step 452 without performing any further processing at steps 412 and 432.

At step 408, the informational F850CR file containing data described in Table 1 or Table 2, depending on which method was applied, i.e., cryptographic (FIG. 2) or manual (FIG. 3), is saved in the INFO folder, using the file name and location provided at step 404. Note that the informational F850CR file does not necessarily contain a value in the SAGComplianceKey data element.

At step 412, the SAG Software 104 constructs a request message 416 containing data described in Table 1 or Table 2, depending on which method was applied, i.e., cryptographic (FIG. 2) or manual (FIG. 3), which is received by the SAG Server Software at step 440 where the SAG Server Software will produce a tamperproof F850CR record which is returned to the SAG Software 104 in reply step 420.

At step 440, the SAG Server Software 136 creates a tamperproof F850CR record by generating a unique Compliance Key, called the SAGComplianceKey, along with the other information supplied in message 416 containing data described in Table 1 or Table 2, depending on which method was applied, i.e., cryptographic (FIG. 2) or manual (FIG. 3). The contents of the tamperproof F850CR record are then digitally signed in step 440 using the SAG Server Software's secret key and encrypted using the SAG Server Software's public key, resulting in the final form of a tamperproof F850CR record, which is placed into message 420 and sent to the SAG Software 104 where it is received at step 412.

Upon receipt of the tamperproof F850CR record, the SAG Software 104 saves the encrypted and signed F850CR file in step 428 in the COMP folder using information obtained in step 404. If the F850CR indicates a PASS grade for both integrity and authenticity, the SAG Server Software 136, at step 440, may update the List of Trusted Software Objects 702 stored in step 436 with information showing the party that assigned the integrity and authenticity results along with other identifying information contained in the tamperproof F850CR. The SAG Server Software applies a scoring system that counts the number of "PASS" results for each Software Object 702. Information in the List of Trusted Software Objects 702 may be used to construct reports of trusted Software Objects 702 for regulators, or End Users, to view and report on. The F850CR data contained in step 416, regardless of PASS and/or FAIL results, will also be stored in step 436, in data tables containing contextual information relating to the registered user. This information may be used to generate an F850CR compliance report showing the results of verification performed by the SAG Software 104. Optionally, the tamperproof F850CR file may be stored on the SAG Server System 720 (FIG. 1) in step 444, based on information obtained from the SAG Software 104 during execution or from operating parameters stored on the SAG Server System 720 (FIG. 1).

At step 448, the SAG Server Software 136 generates a summary version of the tamperproof F850CR, referred to as a SAG Proof of Verification ("SAGPOV"), which is sent to the SAG Software 104 in step 424. Upon receipt of the SAGPOV by the SAG Software 104 at step 412, this information is then displayed to the End User. The End User may be provided with a mechanism (e.g., a button) to copy the displayed SAGPOV to the "clipboard" where this information can be pasted into a change management system or other transaction logging system that may be appropriate to record this information. After the SAGPOV has been copied, the End User may be instructed to move this Software Object 702 at step 432 into a trusted repository, for example, only if the results of verification receive a PASS grade for both integrity and authenticity at steps 264 (FIG. 2) or step 356 (FIG. 3), depending on the method applied, i.e., cryptographic (FIG. 2) or manual (FIG. 3), in accordance with NATF guidance. The trusted repository may be a memory storage "vault" located within a BES in which the "PASS" Software Object 702 may be securely stored until the time for that software Object 702 to be installed in the BES cyber system for operation therewithin.

Referring to FIG. 5, which includes FIGS. 5A and 5B taken together, there illustrated is a flowchart diagram of an exemplary embodiment of the logic flow and methods used to generate a human readable version of a tamperproof F850CR record according to the present invention. More specifically, the flowchart diagram of FIG. 5 illustrates an optional method to produce a human readable version of a tamperproof F850CR record produced during a previous SAG Software 104 execution. The output of this method of FIG. 5 may be used as proof of compliance during a NERC or FERC sanctioned audit.

At step 508, an End User initiates execution of the SAG Software 104 using one option, e.g., "translate," along with the location and name of the tamperproof F850CR file to be translated.

At step 512, the SAG Software 104 constructs a translation request 524 and passes this request 524, along with required information e.g., containing the contents of the F850CR file obtained at step 508, to the SAG Server Software 136. The SAG Server Software 136, at step 532, performs a decrypt and integrity check process using cryptographic technologies available on the SAG Server System 720. The results of this Server process in step 532 are constructed into a reply message at 528 to the SAG Software 104 that contains the results of Server processing, which may be a failure result or a translated, human readable F850CR file. Upon receipt of the message 528, the SAG Software 104 may display the contents of the message 528 to the End User and prompt the End User to save this information in a step 520, e.g., on the secondary storage 716 on the SAG Software System 708, or to discard the results, which causes the SAG Software 104 program execution to end, without saving any of the information contained in message 528.

Referring to FIG. 6, there illustrated is a flowchart diagram of an exemplary embodiment of the facilitation of reporting a Cyber Incident in accordance with CIP-008-6 according to the present invention. More specifically, the flowchart diagram of FIG. 6 illustrates a method used to facilitate the reporting of a cyber security incident that may be considered an "attempt to compromise" event, in accordance with NERC CIP-008-3, based on the results of integrity and authenticity methods described herein. Information obtained at step 110 in FIG. 1 in message 152 contains information needed to initiate the reporting of a cyber security event with NERC's E-ISAC and NCCIC.

At step 608, the End User is prompted and asked if the results of verification seen thus far meets the criteria described in materials associated with NERC CIP-008-6 Requirement 1, Part 1, which is used to determine if an event should be reported. If the End User responds with YES, processing will continue with step 612. Instead, if the End User responds with NO, programming branches to step 404 in FIG. 4.

At step 612, the SAG Software 104 facilitates the reporting of this event with NERC's E-ISAC system, using information obtained at step 110 in FIG. 1 that contains operating information needed to interface with the E-ISAC to report a cyber security incident.

At step 616, the SAG Software 104 facilitates the reporting of this event with the DHS NCCIC system, using information obtained at step 110 in FIG. 1 that contains operating information needed to interface with the DHS NCCIC system to report a cyber security incident.

Upon completing steps 612 and 616, processing branches to step 404 in FIG. 4.

Referring to FIG. 7, a block diagram illustrates an exemplary embodiment of a hardware implementation of a computer system 700 according to the present invention. More specifically, FIG. 7 illustrates a distributed client/server computing environment in which a client system, e.g., the SAG Software System 708, and the server system, e.g., the SAG Server System 720, cooperate to collaboratively administer the integrity and authenticity methods of embodiments of the present invention and described and illustrated in more detail herein, along with reporting, search, and other functionality required to complete the verification and recording methods, also described and illustrated in more detail herein.

A Software Object 702 that may be the subject of a SAG Software 104 integrity and verification process according to various exemplary embodiments of the present invention and described and illustrated herein is made available to the SAG Software System 708, for example, via a process described hereinbefore with respect to the initiation method of FIG. 1 that acquires the Software Object 702 from a Software Source Location 704, e.g., a software vendor location. The Software Source Location 704 may be an Internet based node where Software Objects 702 may be downloaded or transferred, or another form of media, such as CD-ROM, magnetic tape or other device capable of transferring the subject Software Object 702. The Software Object 702, which is the input to the SAG Software verification method, is stored in the secondary storage device 712, accessible to the SAG Software System 708 and the SAG Software 104.

Each of the SAG Software System 708 and the SAG Server system 720 may include one or more processors coupled to memory, a network interface, I/O devices used for user inputs/outputs, and persistent secondary storage devices 712, 716 and 728. In some exemplary embodiments, the SAG Software System 708 implements the functionality of the SAG Software 104 (FIG. 1), and the SAG Server System 720 implements the functionality of the SAG Server Software 136 (FIG. 1). In various embodiments, a SAG client node 708 and a SAG Server node 720 may be a uniprocessor system including one processor, or a multiprocessor system including several processors (e.g., two, four, eight, or another suitable number). Processors may be any suitable processor capable of executing instructions. For example, in various embodiments, the processors may be general-purpose or embedded microprocessors implementing any of a variety of instruction set architectures ("ISAs"), such as the x86, PowerPC, SPARC, or MIPS ISAs, or any other suitable ISA.

The memory that is part of the SAG Software System 708 and the SAG Server System 720 may include a non-transitory, computer-readable storage device configured to store program instructions and/or data utilized by processor(s) that are part of the Systems 708 and 720. The system memory may be implemented using any suitable memory technology, such as static random-access memory ("SRAM"), synchronous dynamic RAM ("SDRAM"), non-volatile/Flash-type memory, or any other type of memory. Program instructions embodied in the SAG Software 104 and the SAG Server Software 136, implementing the functionality disclosed herein are stored within system memory 708 and 720, respectively. For example, instructions executed by the SAG Software System processor(s) 708 implement the methods used to carry out verification of Software Object 702 integrity and authenticity, and other supporting functions, such as blacklisting lookups, disclosed herein.

Secondary storage 712, 716 and 728 may include volatile or non-volatile storage and storage devices for storing information such as program instructions and/or data as described herein for a SAG Software System 104 and SAG Server Software 136. The secondary storage 712 and 716 may include various types of computer-readable media accessible by the SAG Software System 104 via a wired interconnection or network interface attached to the SAG Software System 708. The secondary storage 728 may include various types of computer-readable media accessible by the SAG Server System 720 via a wired interconnection or network interface attached to the SAG Server System 720. A computer-readable medium may include storage media or memory media such as semiconductor storage, magnetic or optical media, e.g., disk or CD/DVD-ROM, or other storage technologies. Program instructions, operating parameters, SAGScore data and formulas and other data stored on the secondary storage 716 may be transmitted to the SAG Software System 708 for execution using a wired or network interface, or both. Program instructions and data stored on the secondary storage 728 may be transmitted to a SAG Server System 720 for execution using a wired or network interface, or both.

Each System 708 and 720 may contain a network interface that may be configured to allow data to be exchanged between computing nodes 708 and 720 and/or other devices accessible via network interface (such as other computer systems, communication devices, input/output devices, or external storage devices). Each System's network interface may support communication via wired or wireless data networks, such as any suitable type of Ethernet network, for example: via telecommunications/telephony networks such as analog voice networks or digital fiber communications networks; via storage area networks such as Fibre Channel SANs; or via any other suitable type of network and/or protocol.

Input/output devices attached to each System 708, 720 may include one or more display terminals, keyboards, keypads, touchpads, mice, scanning devices, voice or optical recognition devices, or any other devices suitable for entering or retrieving data by one or more computing nodes. Multiple input/output devices may be present in each System 708, 720 or may be distributed on various computing nodes accessible to each System 708, 720. In some embodiments, similar input/output devices may be separate from Systems 708 and 720 and may interact with one or more computing nodes through a wired or wireless connection, such as over network interface.

A secure, private keystore component 724, contains the SAG Server "secret key" used for signing and decryption activities, may be accessible to the SAG Server System 720 via a secure, hardened hardware appliance that is designed to protect the confidentiality and integrity of encryption and signing digital keys and/or via tightly secured secondary storage 728. Relatively high security controls may be embedded in all implementations to protect both read and write access to the keystore component and to the keys stored in the keystore.

Numerous search sites 740 may be located within the cloud 736. These sites are known by the SAG Server 720 and are used throughout the integrity and authenticity verification process described and illustrated herein.

Those skilled in the art will appreciate that the computing systems and the configuration contained in FIG. 7 are merely illustrative and are not intended to limit the scope of embodiments of the present invention. In particular, each computing System 708 and 720 may include any combination of hardware or software that can perform the functions disclosed herein, including computers, network devices, internet appliances, PDAs, wireless phones, pagers, etc. Computing Systems 708 and 720 may also be connected to other devices that are not illustrated, in some embodiments. In addition, the functionality provided by the illustrated components may in some embodiments be combined in fewer components or distributed in additional components. Similarly, in some embodiments the functionality of some of the illustrated components may not be provided and/or other additional functionality may be available.

Those skilled in the art will also appreciate that in some embodiments the functionality disclosed herein may be provided in alternative ways, such as being split among more software modules or routines or consolidated into fewer modules or routines. Similarly, in some embodiments illustrated methods may provide more or less functionality than is described, such as when other illustrated methods instead lack or include such functionality respectively, or when the amount of functionality that is provided is altered. In addition, while various operations may be illustrated as being performed in a particular manner (e.g., in serial or in parallel) and/or in a particular order, those skilled in the art will appreciate that in other embodiments the operations may be performed in other orders and in other manners. The various methods as depicted in the figures and described herein represent illustrative embodiments of methods. The methods may be implemented in software, in hardware, or in a combination thereof in various embodiments. Similarly, the order of any method may be changed, and various elements may be added, reordered, combined, omitted, modified, etc., in various embodiments.

The methods described in this document adhere to and implement the recommended NATF guidance, as indicated below. For example: processes or procedural controls that require End Users to obtain software directly from the developer or vendor's preferred delivery methods; processes used to deliver software and appropriate control(s) that will verify the identity of the Software Source and the integrity of the Software Object 702 delivered through these processes. To the extent that the Responsible Entity uses automated systems such as a subscription service to download and distribute software including updates, software verification may likely be an automated byproduct; use of SSL or HTTPS for downloading software updates such that PKI certificates are used for 3rd party verification from a Certificate Authority ("CA") to verify the identity of the server hosting the updates; and use of a secure central software repository after the identity of the Software Source and the integrity of the Software Object 702 have been validated, so that verifications do not need to be performed repeatedly before each installation.

The SAG Software 104 in accordance with exemplary embodiments of the present invention provides a Responsible Entity with the following set of functionalities and deliverables to allow the Responsible Entity to comply with FERC Order 850's first objective (i.e., verification of Software Object 702 and Supply Chain integrity and authenticity), and also to facilitate reporting of cyber incidents in accordance with NERC CIP-008-6: a method to produce a tamperproof F850CR of SAG Software 104 executions containing the results of methods used to verify the integrity and authenticity of a Software Object 702 and its Supply Chain, as described and illustrated in more detail herein; a method to produce a statistical confidence level of trustworthiness in integrity and authenticity results (i.e., the SAGScore), as described and illustrated in more detail herein; an informational representation of the F850CR record for human consumption produced by the SAG Software 104 during verification activities and stored, e.g., on the SAG Software System filesystem in the INFO folder. The informational F850CR is not sufficient by itself to be used as evidence of compliance. Sufficient compliance evidence is available in the form of a "compliance report" generated by the SAG Server Software 136 using the tamperproof F850CR record as input, resulting in a human readable TF850CR report of the contents of the tamperproof F850CR record; a tamperproof representation of the F850CR record produced by the SAG Software 104 during verification activities and stored, e.g., on the SAG Software System filesystem in the COMP folder; both the informational and tamperproof representations of the F850CR record contain the results of both integrity and authentication verification methods performed by the SAG Software 104 on a Software Object 702 and its Supply Chain; an optional "cloud based" recording service available from the SAG Server ("SAGS") application to serve as a persistent datastore of tamperproof F850CR records produced during the verification of both integrity and authenticity activities from SAG Software 104 executions performed by an End User. This feature may be enabled when an End User of the SAG Software 104 specifies the "SAGS Save" option during runtime; a "cloud based" set of services available from the SAGS to generate human readable, detailed and printable outputs of the entire contents of a tamperproof F850CR record which is transferred by the SAG Software 104 to a SAGS, or in the optional SAGS persistent datastore 728. This output is referred to as a SAG TF850CR report; a "cloud based" set of services available from a SAGS to produce a proof of evidence record, referred to as a SAG Proof of Verification ("SAGPOV") object, which is a shortened summary output generated from a tamperproof F850CR record, that is intended to be applied to a change management system of record or other datastore used to demonstrate compliance during a compliance audit or as needed; a "cloud based" set of services available from a SAGS to produce reports listing a complete accounting of all SAGPOV objects created by the SAGS at the request of a SAG Software End User, using a selective filtering process such as date range. This output report is referred to as the SAG Compliance Report ("SAGCR") for software integrity and authenticity; SAGS tracking of trusted Software Objects 702 based on the cumulative results of SAG Software executions by all SAG Software End Users worldwide and to present information from this List of Trusted Software Objects 702 to the SAG Software End User when deciding to assign a PASS/FAIL result; and a method to facilitate the reporting of suspect Software Objects 702, which may indicate an "attempt to compromise" Cyber Security Incident, to E-ISAC and NCCIC (formerly ICS-CERT), in accordance with NERC standard CIP-008-6, and FERC Docket No. RD19-3-000 filing on Jun. 20, 2019.

An overarching goal of the SAG Software 104 is to protect the integrity of the critical infrastructure and software components of the BES cyber systems, as defined by NERC, and other critical infrastructure cyber assets from the harmful effects of malicious Software Objects 702 that may attempt to disrupt or compromise the operation of a BES cyber system. This is achieved by employing integrity and authenticity verification methods that apply electronic (e.g., software running on one or more computers) and manual techniques, both cryptographic and non-cryptographic, to ascertain the trustworthiness of a Software Object 702 and its Supply Chain prior to installation, upgrade, update, patching, and/or enhancements to the BES cyber systems within, and including those in the Electronic Security Perimeter and to facilitate the reporting of those incidents which would be considered an "attempt to compromise" Cyber Security Incident to E-ISAC and NCCIC (formerly ICS-CERT), in order to prevent the spreading of a potentially malicious Software Object 702 to other parties operating in the BES.

Some of the objectives of the SAG Software 104 verification methods of exemplary embodiments of the present invention include: implement a risk assessment-based approach to verify software integrity and authenticity using best practices; introspection of a Software Object 702 for suspicions that lower trust levels; corroborating evidence from trustworthy sources of vulnerability reports to ascertain a trust level for integrity; corroborating evidence from trustworthy sources of vendor compromises that affect trust in authenticity, i.e. stolen keys, rogue certificates; compromises along the physical path used to obtain software; calculate a SAGScore to aid the End User in deciding to trust or not trust a Software Object 702 and its Supply Chain; always apply current best practices on each background check verification step performed in the risk assessment process; and always store results in a tamperproof record for posterity.

Additional SAG Software 104 objectives include: construct a "Software Bill of Materials" ("SBOM") listing all of the identifiable components contained in a Software Object 702, including shared libraries, embedded open source software, proprietary software components and other externally dependent resources, such as web services from an online service provider, e.g. Amazon AWS or Microsoft Azure; apply cryptographic (e.g., PKI) verification methods for software object integrity and authenticity, when available; perform a virtual online "background check" pertaining to the authentication and integrity of Supply Chain entities, locations and Software Objects 702, culminating in a SAGScore, and provide this information to the Responsible Entity during SAG Software 104 execution to aid in their risk assessment decision; present sufficient information to aid a Responsible Entity in deciding to trust, or not trust, the entities, locations and integrity affiliated with a Software Object 702 and its entire Supply Chain so that a PASS or FAIL decision can be assigned; all of the background check information and responses from the Responsible Entity are stored for posterity in a tamperproof record for further examination by auditor or forensic teams; provide Responsible Entities with a "Proof of Verification" that may be saved in a Change Management System or other system of record for logging changes to BES systems; record sufficient information in a central "List of Trusted Software" that may be presented to other Responsible Entities when they are deciding to trust/not trust a Software Object 702 that has been verified by other Responsible Entities; and facilitate the reporting of "attempt to compromise" cyber security incidents with NERC E-ISAC and NCCIC, when appropriate to do so.

Also, some of the objectives of the SAG Software Object 702 integrity verification methods of exemplary embodiments of the present invention include: a Software Object 702 contains no known malware, viruses or other issues discovered during introspection (e.g., use of suspicious Web services); determine if a Software Object 702 was obtained from a trustworthy location; determine if a Software Object 702 was obtained from trustworthy Supply Chain entities (e.g., distributor, developer, internet repository, etc.); is unaltered from its original intended contents, as provided by a trustworthy Software Source Originator or Software Source using cryptographic methods where possible; a Software Object 702 contains no recorded/known vulnerabilities or reports of suspicious activity (i.e., Bitcoin mining); determine if other parties have assigned a passing grade for integrity verification of a specific Software Object 702; and ensure that companies (e.g., Responsible Entities) are informed of any integrity related risks pertaining to the route used to obtain a Software Object 702, e.g., did it go through a system in a hostile country, such as Iran.

Further, some of the specific objectives of the SAG Software Object 702 Authenticity Verification methods of exemplary embodiments of the present invention include: SAG Software 104 authenticity verification is performed for all three Supply Chain entities: (1) Software Source Originator, (2) Software Source, and (3) Software Source Location; utilize PKI (X.509, CRL's, OCSP, etc.), PGP trust chains, etc. to verify the signing party of a Software Object, when possible, but this is only one step in the process; search for corroborating evidence of an entities proclaimed identity, i.e. NAESB EIR, D&B search, etc.; search for known compromises, fraudulent certificate reports and other information that may affect the trustworthiness of an entity; and determine if an entity has any affiliation with high-risk State actors, e.g., Iran, or known sources of risk, e.g., Dropbox.

Embodiments of the present invention reduce the likelihood that an attacker could exploit legitimate software vendor patch management processes to deliver compromised software updates or patches that could lead to faulty operation or instability in the BES. Also, embodiments of the present invention use best practices available on an ongoing basis to provide the verification methods as types of investigative "background checks" as part of a risk assessment on the authenticity and integrity of a Software Object 702 and its Supply Chain. Embodiments of the present invention also provide a level of confidence that a Software Object 702 to be obtained and used in a BES or other critical infrastructure cyber asset is free from intentional and unintentional vulnerabilities, and that it functions and performs as intended.

Embodiments of the present invention provide a method to facilitate the reporting of any suspected "attempt to compromise" cyber incident which essentially identifies a Software Object 702 as faulty and its Software Source within the Supply Chain as a "bad actor" (i.e., one that cannot be trusted), and then makes the identity of this Software Source known to other energy utility companies so they can avoid acquiring the particular faulty Software Objects 702 from this particular non-trustworthy Software Source. This stops the spread of this faulty Software Object 702 within the electrical utility industry and prevents other electrical utility companies from becoming a victim of this malicious software.

Tamperproof FERC 850 Compliance Record (F850CR) Description. The tables in this section describes the contents of a tamperproof F850CR record. A FERC 850 Compliant Record contains one of the following set of data definitions or elements and their associated contents, depending on which method is used to perform verification—cryptographic or manual:

TABLE 1

F850CR contents produced from cryptographic method

| Element Name | Intended Usage | Data Type | Format Specification | Example Content |
|---|---|---|---|---|
| SAGCustomerID | Uniquely identifies a customer (licensee) of the SAG Software program and SAG Server, this is usually the Responsible Entity | Text String | A valid customer ID | 70357 |
| SAGJurisdictionalEntityName | Contains the name of a FERC Jurisdictional Entity subject to comply with FERC Order 850 and applicable NERC CIP standards | Text String | A Company Name | ISO New England |
| SAGJurisdictionalEntityID | Contains a formally recognized identifier of a FERC Jurisdictional Entity subject to comply with FERC Order 850 and applicable NERC CIP standards | Text String | A Company ID from the NAESB EIR | ISNE |
| SAGResponsibleEntityName | Contains the name of a party operating on behalf of a FERC Jurisdictional Entity to verify a Software Object to comply with FERC Order 850 and applicable NERC CIP standards | Text String | A Company Name | ISO New England |
| TransactionID | Uniquely identifies a F850CR record | Text String | Must contain a globally unique identifier | 573339af-d9e1-5dd3-804c-e0162fac1f41 |

TABLE 1-continued

F850CR contents produced from cryptographic method

| Element Name | Intended Usage | Data Type | Format Specification | Example Content |
|---|---|---|---|---|
| RunDateGMT | Actual GMT date when SAG Software program was executed | Text String | MM/DD/YYYY | 05/19/2019 |
| RunTimeGMT | Actual GMT Time when SAG Software program was executed | Text String | HH:MM:SS.sss | 13:24:30.509 |
| ProcessUsername | Username of the system process in which the SAG Software was executed, this is also referred to as the End User | Text String | Format supplied by the system where SAG runs | SAGuser |
| ProcessID | Process ID in which the SAG Software was executed | Text String | Format supplied by the system where SAG runs | 87335 |
| SystemHostName | Name of the System in which the SAG Software was executed, a/k/a SAG Software System | Text String | Format supplied by the system where SAG runs | Farpoint |
| SWObjectSourceLocation | A Universal Resource Locator (URL) indicating the location where the Software Object was made available to the Responsible Entity | Text String | URL | https://download.microsoft.com/download/C/4/8/C48F6E20-FE20-41C6-8C1C-408FE7B49A3A/Windows7-USB-DVD-Download-Tool-Installer-en-US.exe https://www.amazon.com/Avast-Free-Antivirus-2018-Download/dp/B017W85QUQ/ref=sr_1_5?crid=90FADFW0RBTE&keywords=anti-virus+software+2019&qid=1563222444&s=gateway&sprefix=anti-virus%2Caps%2C251&sr=8-5 |
| SWObjectLocation | Local filesystem path to the Software Object(s) to be verified accessible to the SAG Software System | Text String | URL | file:///C:/Users/Dick/Downloads/Windows7-USB-DVD-Download-Tool-Installer-en-US(1).exe |
| SWObjectDateProperties | Last modified date and time as recorded on the local filesystem entry for the Software Object to be verified | Text String | As provided by the filesystem entry of the Software Object | May 19, 2019 4:12 PM |
| SWObjectSourceOriginatorPartName | Legal Name of the party claiming to be the Software Source Originator and authorized licensor | Text String | Name as provided by the Software Source Originator | Microsoft Corporation |
| SWObjectSourceOriginatorPartyID | Unique identifier for this Software Source Originator | Text String | A formally recognized party ID, i.e., DUNS number or similar third- | 111509681 |

TABLE 1-continued

F850CR contents produced from cryptographic method

| Element Name | Intended Usage | Data Type | Format Specification | Example Content |
|---|---|---|---|---|
| | | | party identifier - i.e., digital certificate | |
| SWSoftwareSourcePartyName | The name of the Software Source that made the Software Object available to the Responsible Entity | Text String | Legal Name of the party that may be the Software Source | Amazon Technologies |
| SWObjectSigningKeyIDLocation | A Universal Resource Locator (URL) indicating the location where signing key verification data is stored. This could be an X.509 certificate | Text String | URL | https://gnupg.org/signature_key.html<br>file://vms.host.edu/disk$user/my/notes/ X509Cert.PEM |
| SWObjectSigningKeyIDvalue | A value used to identify the key used to sign the Software Object | Text String | Signing key identifier in a format supplied by the Software Source used to sign the Software Object | pub rsa2048 2014-10-29 [expires: 2019-12-31]<br>Key fingerprint = 46CC 7308 65BB 5C78 EBAB ADCF 0437 6F3E E085 6959<br>uid David Shaw (GnuPG Release Signing Key)<br>NOTE: This could also contain information stored in an X.509 certificate file |
| SWObjectSize | The size in bytes of the Software Object contained in the specified SWObjectLocation | Text String | Byte Count | 123,456,789,444 |
| SWProductName | The assigned name of the software product commonly known in industry | Text String | The name as assigned by the Software Source Originator | Windows 10 |
| SWProductVersioningData | Identifying characteristics indicating a release or patch identifier | Text String | An identifier as supplied by the Software Source Originator | Build 1634 |
| SWPublicationDateTime | Information describing the point in time when the Software Object was published for public use as provided by the Software Source or Software Source Originator | Text String | ISO 8601 format | 20190512T00:00:00Z |
| SWObjectIntegrityCheckTarget | A value, provided by the Software Source Originator used to verify Software Object integrity | Text String | A value supplied by the Software Source Originator to be used for integrity verification of | 1909afdad3cf29583126c471298da290399270f4 |

TABLE 1-continued

F850CR contents produced from cryptographic method

| Element Name | Intended Usage | Data Type | Format Specification | Example Content |
|---|---|---|---|---|
| SWObjectComputedHashValue | A hash value computed by SAG Software over the Software Object. Should match the value in SWObjectIntegrityCheckTarget if one is available | Text String | A value calculated by the SAG Software over a Software Object | 1909afdad3cf29583126c471298da290399270f4 |
| SWObjectAuthCheckTarget | A value provided by the Software Source or Software Source Originator used to verify Software Object authenticity | Text String | A key fingerprint or similar identifier supplied by the Software Source Originator | 46CC 7308 65BB 5C78 EBAB ADCF 0437 6F3E E085 6959 |
| SWIntegrityVerificationMethod | Describes the method used to verify Software Object integrity, a/k/a hashing algorithm | Text String | Identifier of formally recognized methods, i.e. SHA-256, SHA-1 | SHA-256 |
| SWDigitalSignatureAlgorithm | Described the digital signature algorithm used to sign the Software Object | Text String | Identifier of formally recognized algorithms, i.e., RSA | RSA |
| SWAuthenticityVerificationMethod | Describes the method used to verify Software Source Originator is the authorized issuer of the Software Object | Text String | Identifier of conventional method used to check authenticity, i.e., signing key fingerprint | Key fingerprint |
| BlacklistSearchResults | Results of blacklist search, whois and tracert results and end user response | Text String | Verbatim results from blacklist search and prompt response from end user | No Blacklist entries found Whois results: Domain Name: MICROSOFT.COM Registry Domain ID: 2724960_DOMAIN_COM-VRSN Registrar WHOIS Server: whois.markmonitor.com Registrar URL: http://www.markmonitor.comUpdated Date: 2014-10-09T16:28:25Z Creation Date: 1991-05-02T04:00:00Z Registry Expiry Date: 2021-05-03T04:00:00Z Registrar: MarkMonitor Inc. Registrar IANA ID: 292 Registrar Abuse Contact Email: abusecomplaints@markmonitor.com Registrar Abuse Contact Phone: +1.2083895740 Domain Status: clientDeleteProhibited https://icann.org/epp#clientDeleteProhibited Domain Status: clientTransferProhibited |

TABLE 1-continued

F850CR contents produced from cryptographic method

| Element Name | Intended Usage | Data Type | Format Specification | Example Content |
|---|---|---|---|---|
| | | | | https://icann.org/epp#clientTransferProhibited |
| | | | | Domain Status: clientUpdateProhibited https://icann.org/epp#clientUpdateProhibited |
| | | | | Domain Status: serverDeleteProhibited https://icann.org/epp#serverDeleteProhibited |
| | | | | Domain Status: serverTransferProhibited https://icann.org/epp#serverTransferProhibited |
| | | | | Domain Status: serverUpdateProhibited https://icann.org/epp#serverUpdateProhibited |
| | | | | Name Server: NS1.MSFT.NET |
| | | | | Name Server: NS2.MSFT.NET |
| | | | | Name Server: NS3.MSFT.NET |
| | | | | Name Server: NS4.MSFT.NET |
| | | | | DNSSEC: unsigned |
| | | | | Tracert Results |
| | | | | C:\Users\Dick>tracert technet.microsoft.com |
| | | | | Tracing route to e12594.b.akamaiedge.net [23.203.126.198] over a maximum of 30 hops: |
| | | | | 1  1 ms  2 ms  1 ms setup.lan [192.168.1.1] |
| | | | | 2  8 ms  5 ms  8 ms 208.236.210.1 |
| | | | | 3  16 ms  8 ms  9 ms 172.17.1.166 |
| | | | | 4  13 ms  16 ms  18 ms jfk2-edge-02.inet.qwest.net [63.235.92.45] |
| | | | | 5  12 ms  16 ms  16 ms jfk-brdr-04.inet.qwest.net [67.14.5.98] |
| | | | | 6  22 ms  16 ms  16 ms ae3 .cr5-nyc2.ip4.gtt.net [199.229.229.205] |
| | | | | 7  12 ms  17 ms  18 ms et-1-0-31.cr4-nyc6.ip4.gtt.net [213.200.121.18] |
| | | | | 8  13 ms  15 ms  16 ms a23-203-126-198.deploy.static.akamaitechnologies.com [23.203.126.198] |
| | | | | Trace complete. |
| | | | | End User Response: CONTINUE |
| VulnerabilitySearchResults | Results of vulnerability search and trusted Software Object search and End User response | Text String | Verbatim search results from vulnerability and trusted Software Object searches and End User prompt | No vulnerabilities found. Also trusted by PJM and MISO. End User response: Continue = YES |
| IdentitySearchResults | Results of searching known trusted sources of identity information and response from End User | Text String | Verbatim results from searches | NAESB EIR Reports the known ID for Microsoft Corp is MSFT |
| CompromisesSearchResults | Results of searching | Text String | Verbatim results from | No compromises detected. |

TABLE 1-continued

F850CR contents produced from cryptographic method

| Element Name | Intended Usage | Data Type | Format Specification | Example Content |
|---|---|---|---|---|
| | known trusted sources information pertaining to compromised credentials | | searches | |
| SAGScore | Statistically calculated value indicating a confidence level in the trustworthiness of the results from authenticity and integrity verification | Text String | Calculated value | .95 |
| SWIntegrityVerificationResult | Final result of SAG program execution from the software integrity verification process assigned by the End User, based on SAG Software presented results | Text String | PASS FAIL | PASS |
| SWAuthenticityVerificationResult | Final result of SAG program execution from the software authenticity verification process assigned by the End User, based on SAG Software presented results | Text String | PASS FAIL | PASS |
| SAGSWVersion | Version identifier of the SAG Software used to produce a F850CR record | Text String | Software version identifier | 3.1 |
| SAGSWIssueDateTime | Issue date and time associated with the SAG Software program used to produce a F850CR record | Text String | ISO 8601 format | 2019-05-19T13:17:47+00:00 |
| SAGComplianceKey | A unique identifier that only exists in the encrypted, tamperproof F850CR record and is not present in the informational representation of the F850CR | Text String | Must contain a globally unique identifier | 573339af-d9e1-5dd3-804c-e0162fac1196a |
| AdditionalComments | Text entered by the End User to help explain the reasoning behind why they elected a PASS or FAIL result | Text String | Writeup from end user. May be blank | A FAIL result was assigned for questionable authenticity information resulting from contents of a NIST vulnerability report for this Software Object. |

TABLE 1-continued

F850CR contents produced from cryptographic method

| Element Name | Intended Usage | Data Type | Format Specification | Example Content |
|---|---|---|---|---|
| ReportedAsCyberIncident | A Y/N flag indicating that a cyber incident was reported or not reported | Text String | Y or N | N |

TABLE 2

F850CR content produced from manual methods

| Element Name | Intended Usage | Data Type | Format Specification | Example Content |
|---|---|---|---|---|
| SAGCustomerID | Uniquely identifies a customer (licensee) of the SAG Software program and SAG Server, this is usually the Responsible Entity | Text String | A valid custom ID | 70357 |
| SAGJurisdictionalEntityName | Contains the name of a FERC Jurisdictional Entity subject to comply with FERC Order 850 and applicable NERC CIP standards | Text String | A Company Name | ISO New England |
| SAGJurisdictionalEntityID | Contains a formally recognized identifier of a FERC Jurisdictional Entity subject to comply with FERC Order 850 and applicable NERC CIP standards | Text String | A Company ID from the NAESB EIR | ISNE |
| SAGResponsibleEntityName | Contains the name of a party operating on behalf of a FERC Jurisdictional Entity to verify a Software Object to comply with FERC Order 850 and applicable NERC CIP standards | Text String | A Company Name | ISO New England |
| TransactionID | Uniquely identifies a F850CR record | Text String | Must contain a globally unique identifier | 573339af-d9e1-5dd3-804c-e0162fac1f41 |
| RunDateGMT | Actual GMT date when SAG program was executed | Text String | MM/DD/YYYY | 05/19/2019 |
| RunTimeGMT | Actual GMT Time when | Text String | HH:MM:SS.sss | 13:24:30.509 |

TABLE 2-continued

F850CR content produced from manual methods

| Element Name | Intended Usage | Data Type | Format Specification | Example Content |
|---|---|---|---|---|
| ProcessUsername | SAG program was executed Username of the system process in which the SAG Software was executed, this is also referred to as the End User | Text String | Format supplied by the system where SAG runs | SAGuser |
| ProcessID | Process ID in which the SAG Software was executed | Text String | Format supplied by the system where SAG runs | 87335 |
| SystemHostName | Name of the System in which the SAG Software was executed, a/k/a SAG Software System | Text String | Format supplied by the system where SAG runs | Farpoint |
| SWObjectSourceLocation | A Universal Resource Locator (URL) indicating the location where the Software Object was made available to the Responsible Entity | Text String | URL | https://download.microsoft.com/download/C/4/8/C48F6E20-FE20-41C6-8C1C-408FE7B49A3A/Windows7-USB-DVD-Download-Tool-Installer-en-US.exe https://www.amazon.com/Avast-Free-Antivirus-2018-Download/dp/B017W85QUQ/ref=sr_1_5?crid=90FADFW0RBTE&keywords=anti-virus+software+2019&qid=1563222444&s=gateway&sprefix=anti-virus%2Caps%2C251&sr=8-5 |
| SWObjectLocation | Local filesystem path to the Software Object(s) to be verified accessible to the SAG Software System | Text String | URL | file:///C:/Users/Dick/Downloads/Windows7-USB-DVD-Download-Tool-Installer-en-US(1).exe |
| SWObjectDateProperties | Last modified date and time as recorded on the local filesystem for the Software Object to be verified | Text String | As provided by the filesystem entry of the Software Object | May 19, 2019 4:12 PM |
| SWObjectSourceOriginatorPartyName | Legal Name of the party claiming to be the Software Source Originator and authorized licensor | Text String | Name as provided by the Software Source Originator | Microsoft Corporation |
| SWObjectSourceOriginatorPartyID | Unique identifier for this Software Source Originator | Text String | A formally recognized party ID, i.e., DUNS number or similar third-party identifier - i.e., digital certificate | 111509681 |
| SWSoftwareSourcePartyName | The name of the Software Source that made the Software Object | Text String | Legal Name of the party that may be the Software Source | Amazon Technologies |

TABLE 2-continued

F850CR content produced from manual methods

| Element Name | Intended Usage | Data Type | Format Specification | Example Content |
|---|---|---|---|---|
| | available to the Responsible Entity | | | |
| SWObjectSize | The size in bytes of the source object contained in the specified SWObjectLocation | Text String | Byte Count | 123,456,789,444 |
| SWProductName | The assigned name of the software product commonly known in industry | Text String | The name as assigned by the Software Source Originator | Windows 10 |
| SWProductVersioningData | Identifying characteristics indicating a release or patch identifier | Text String | An identifier as supplied by the Software Source Originator | Build 1634 |
| SWPublicationDateTime | Information describing the point in time when the Software Object was published for public use as provided by the Software Source or Software Source Originator | Text String | A date and, optionally a time | 20190512T00:00:00Z |
| SWObjectComputedHashValue | A hash value computed by SAG Software over the Software Object | Text String | A value calculated by the SAG Software | 1909afdad3cf29583126c471298da290399270f4 |
| HashAlgorithm | Describes the algorithm used to calculate the SWObjectComputedHashValue | Text String | Identifier of formally recognized methods, i.e. SHA-256, SHA-1 | SHA-256 |
| BlacklistSearchResults | Results of blacklist search, whois and tracert results and End User response | Text String | Verbatim results from blacklist search and prompt response from End User | No Blacklist entries found Whois results: Domain Name: MICROSOFT.COM Registry Domain ID: 2724960_DOMAIN_COM-VRSN Registrar WHOIS Server: whois.markmonitor.com Registrar URL: http ://www.markmonitor.com Updated Date: 2014-10-09T16:28:25Z Creation Date: 1991-05-02T04:00:00Z Registry Expiry Date: 2021-05-03T04:00:00Z Registrar: MarkMonitor Inc. Registrar IANA ID: 292 Registrar Abuse Contact Email: abusecomplaints@markmonitor.com Registrar Abuse Contact Phone: +1.2083895740 Domain Status: clientDeleteProhibited https://icann.org/epp#clientDeleteProhibited Domain Status: clientTransferProhibited |

TABLE 2-continued

F850CR content produced from manual methods

| Element Name | Intended Usage | Data Type | Format Specification | Example Content |
| --- | --- | --- | --- | --- |
| | | | | https://icann.org/epp#clientTransferProhibited<br>Domain Status: clientUpdateProhibited<br>https://icann.org/epp#clientUpdateProhibited<br>Domain Status: serverDeleteProhibited<br>https://icann.org/epp#serverDeleteProhibited<br>Domain Status: serverTransferProhibited<br>https://icann.org/epp#serverTransferProhibited<br>Domain Status: serverUpdateProhibited<br>https://icann.org/epp#serverUpdateProhibited<br>Name Server: NS1.MSFT.NET<br>Name Server: NS2.MSFT.NET<br>Name Server: NS3.MSFT.NET<br>Name Server: NS4.MSFT.NET<br>DNSSEC: unsigned<br>Tracert Results<br>C:\Users\Dick>tracert technet.microsoft.com<br>Tracing route to el2594.b.akamaiedge.net [23.203.126.198]<br>over a maximum of 30 hops:<br>1  1 ms  2 ms  1 ms setup.lan [192.168.1.1]<br>2  8 ms  5 ms  8 ms 208.236.210.1<br>3  16 ms  8 ms  9 ms 172.17.1.166<br>4  13 ms  16 ms  18 ms jfk2-edge-02.inet.qwest.net [63.235.92.45]<br>5  12 ms  16 ms  16 ms jfk-brdr-04.inet.qwest.net [67.14.5.98]<br>6  22 ms  16 ms  16 ms ae3 .cr5-nyc2.ip4.gtt.net [199.229.229.205]<br>7  12 ms  17 ms  18 ms et-1-0-31.cr4-nyc6.ip4.gtt.net [213.200.121.18]<br>8  13 ms  15 ms  16 ms a23-203-126-198.deploy.static.akamaitechnologies.com [23.203.126.198]<br>Trace complete.<br>End User Response: CONTINUE |
| VulnerabilitySearchResults | Results of vulnerability search and trusted Software Object search and End User response | Text String | Verbatim search results from vulnerability and trusted Software Object searches and End User prompt | No vulnerabilities found.<br>Also trusted by PJM and MISO.<br>End User response:<br><br>Continue = YES |
| IdentitySearchResults | Results of searching known trusted sources of identity information and response from End User | Text String | Verbatim results from searches | NAESB EIR Reports the known ID for Microsoft Corp is MSFT |
| CompromisesSearchResults | Results of searching | Text String | Verbatim results from | No compromises detected. |

TABLE 2-continued

F850CR content produced from manual methods

| Element Name | Intended Usage | Data Type | Format Specification | Example Content |
|---|---|---|---|---|
| | known trusted sources information pertaining to compromised credentials | | searches | |
| SAGScore | Statistically calculated value indicating a confidence level in the trustworthiness of the results from authenticity and integrity verification | Text String | Calculated value | .95 |
| SWIntegrityVerificationResult | Final result of SAG program execution from the software integrity verification process assigned by the End User, based on SAG Software presented results | Text String | PASS FAIL | PASS |
| SWAuthenticityVerificationResult | Final result of SAG program execution from the software authenticity verification process assigned by the End User, based on SAG Software presented results | Text String | PASS FAIL | PASS |
| SAGSWVersion | Version identifier of the SAG Software used to produce a F850CR record | Text String | Software version identifier | 3.1 |
| SAGSWIssueDateTime | Issue date and time associated with the SAG Software program used to produce a F850CR record | Text String | ISO 8601 format | 2019-05-19T13:17:47+00:00 |
| SAGComplianceKey | A unique identifier that only exists in the encrypted, tamperproof F850CR record and is not present in the informational representation of the F850CR | Text String | Must contain a globally unique identifier | 573339af-d9e1-5dd3-804c-e0162fac1196a |
| AdditionalComments | Text entered by the End User to help explain the reasoning behind why they elected a PASS or FAIL result | Text String | Writeup from End User. May be blank | A FAIL result was assigned for questionable authenticity information resulting from contents of a NIST vulnerability report for this Software Object. |

TABLE 2-continued

F850CR content produced from manual methods

| Element Name | Intended Usage | Data Type | Format Specification | Example Content |
| --- | --- | --- | --- | --- |
| ReportedAsCyberIncident | A Y/N flag indicating that a cyber incident was reported or not reported | Text String | Y or N | N |

TABLE 3

SAG Software Options

| Option | Description |
| --- | --- |
| comprehensive [default] | Default operation when no option is provided. Perform a complete verification of Software Object integrity and authenticity and produce F850CR results in both informational and tamperproof forms |
| translate | Request that a tamperproof F850CR file be translated into human readable form |
| save | Instruct SAG Server to save a copy of the tamperproof F850CR file |
| trustsearch | Search the list of trusted objects for an entry |
| showparams | Return a list of the all the operating parameters within the SAG Server |
| version | Display SAG Software versioning and other identifying characteristics of the SAG Software |
| help | Displays information on how to use the SAG Software |
| about | Displays information about the SAG Software license and licensee |
| verifyonly | Performs all of the normal steps to perform verification but does not produce an F850CR file or SAGPOV and will not update the list of trusted Software Objects |

The terminology used herein is for the purpose of describing particular embodiments of the invention only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the invention is provided in detail in connection with only a limited number of embodiments, it should be readily understood that the invention is not limited to such disclosed embodiments. Rather, the invention can be modified to incorporate any number of variations, alterations, substitutions, or equivalent arrangements not heretofore described, but which are commensurate with the spirit and scope of the invention. Additionally, while various embodiments of the invention have been described, it is to be understood that the exemplary embodiments may include only some of the described exemplary aspects. Accordingly, the invention it not to be seen as limited by the foregoing description but is only limited by the scope of the appended claims.

What is claimed is:

1. A computer-implemented method, comprising:
   determining, by a processor, an authenticity of a software object and its supply chain and providing an authenticity result indicative thereof;
   determining, by the processor, an integrity of the software object and its supply chain and providing an integrity result indicative thereof; and
   determining, by the processor, from the authenticity result and the integrity result, a score indicative of an amount of trust in the supply chain of the software object and in the software object, wherein the score is indicative of an amount of trust that the software object will work correctly if installed in a system that utilizes the software object; and
   wherein determining, by the processor, from the authenticity result and the integrity result, a score indicative of an amount of trust in the supply chain of the software object and in the software object, further comprises:
   determining, by the processor, a level of risk associated with each of one or more control functions associated with the supply chain of the software object and with the software object as indicated by the authenticity result and the integrity result, wherein each of the one or more control functions includes at least one risk factor;
   assigning, by the processor, a weight to each of the at least one risk factor of each of the one or more control functions; and
   determining, by the processor, the score through use of the assigned weights.

2. The computer-implemented method of claim 1, further comprising determining, by the processor, from information relating to the software object whether the software object contains a digital signature.

3. The computer-implemented method of claim 2, wherein if the software object contains a digital signature, determining, by the processor, whether the software object has been altered from its original form as provided by a source of the software object and by a cryptographic identifier of the source of the software object as contained in the digital signature.

4. The computer-implemented method of claim 2, wherein if the software object contains a digital signature, then:
- determining, by the processor, an authenticity of the software object and its supply chain using cryptography and providing an authenticity result indicative thereof; and
- determining, by the processor, an integrity of the software object and its supply chain using cryptography and providing an integrity result indicative thereof.

5. The computer-implemented method of claim 2, wherein if the software object does not contain a digital signature, then:
- determining, by the processor, an authenticity of the software object and its supply chain using one or more techniques other than cryptography and providing an authenticity result indicative thereof; and
- determining, by the processor, an integrity of the software object and its supply chain using one or more techniques other than cryptography and providing an integrity result indicative thereof.

6. The computer-implemented method of claim 1, wherein the score is provided by the processor to a user to assist the user in making a risk-based decision whether to install the software object in a system for use thereby.

7. The computer-implemented method of claim 1, wherein the one or more control functions associated with the supply chain of the software object and with the software object includes information relating to characteristics of the supply chain of the software object and the software object pertaining to an amount of risk that the software object would pose to proper operation of the system if the software object were to be installed in the system.

8. The computer-implemented method of claim 1, further comprising creating, by the processor, a tamperproof record with contents that include the authenticity result and the integrity result.

9. The computer-implemented method of claim 8, further comprising digitally signing, by the processor, the contents of the tamperproof record using a secret key, and encrypting, by the processor, the contents of the tamperproof record using a public key.

10. The computer-implemented method of claim 8, further comprising creating, by the processor, a proof of verification with contents that includes a summary version of the tamperproof record.

11. The computer-implemented method of claim 10, further comprising displaying, by the processor, the contents of the proof of verification, and recording, by the processor, the contents of the proof of verification in a transaction logging system.

12. The computer-implemented method of claim 8, further comprising updating, by the processor, a list of software objects that have been determined to be trusted as indicated by both the authenticity result and the integrity result.

13. The computer-implemented method of claim 8, further comprising creating, by the processor, a human readable version of the tamperproof record.

14. The computer-implemented method of claim 1, further comprising determining, by the processor, an existence of an attempt to compromise of the software object and whether to report the existence of an attempt to compromise as a cyber security incident.

15. The computer-implemented method of claim 14, wherein determining, by the processor, whether to report the existence of an attempt to compromise as a cyber security incident comprises determining, by the processor, whether to report the existence of an attempt to compromise as a cyber security incident based on predetermined criteria provided by an organization.

16. The computer-implemented method of claim 1, further comprising determining, by the processor, whether the software object contains any vulnerabilities or has been subject to potential compromise.

17. The computer-implemented method of claim 16, wherein determining, by the processor, whether the software contains any vulnerabilities or has been subject to potential compromise comprises performing, by the processor, an anti-virus/malware scan of the software object.

18. The computer-implemented method of claim 16, wherein if the software object contains any vulnerabilities or has been subject to potential compromise, further comprising determining, by the processor, an existence of an attempt to compromise of the software object and whether to report the existence of an attempt to compromise as a cyber security incident.

19. The computer-implemented method of claim 18, wherein determining, by the processor, whether to report the existence of an attempt to compromise as a cyber security incident comprises determining, by the processor, whether to report the existence of an attempt to compromise as a cyber security incident based on predetermined criteria provided by an organization.

* * * * *